(12) United States Patent
Yu et al.

(10) Patent No.: US 12,574,874 B2
(45) Date of Patent: Mar. 10, 2026

(54) CLOCK SYNCHRONIZATION MODE INDICATION METHOD AND COMMUNICATION APPARATUS

(71) Applicant: HUAWEI TECHNOLOGIES CO., LTD., Shenzhen (CN)

(72) Inventors: Fang Yu, Shenzhen (CN); Yan Li, Beijing (CN); Jingfei Lv, Wuhan (CN)

(73) Assignee: HUAWEI TECHNOLOGIES CO., LTD., Shenzhen (CN)

( * ) Notice: Subject to any disclaimer, the term of this patent is extended or adjusted under 35 U.S.C. 154(b) by 455 days.

(21) Appl. No.: 18/167,957

(22) Filed: Feb. 13, 2023

(65) Prior Publication Data

US 2023/0199683 A1      Jun. 22, 2023

Related U.S. Application Data

(63) Continuation of application No. PCT/CN2020/108740, filed on Aug. 12, 2020.

(51) Int. Cl.
*H04W 56/00* (2009.01)

(52) U.S. Cl.
CPC .............................. *H04W 56/0015* (2013.01)

(58) Field of Classification Search
CPC .......... H04J 3/0658; H04J 3/0667; H04J 3/12; H04W 56/0015
USPC ........................................................ 370/329
See application file for complete search history.

(56) References Cited

U.S. PATENT DOCUMENTS

| | | | | |
|---|---|---|---|---|
| 11,909,652 B2 * | 2/2024 | Wang | .................. | H04L 47/2491 |
| 12,149,341 B2 * | 11/2024 | Wang | .................... | H04J 3/0641 |
| 2019/0190635 A1 | 6/2019 | Goel et al. | | |
| 2021/0194613 A1 * | 6/2021 | Kwon | .................... | H04J 3/0697 |
| 2021/0359778 A1 * | 11/2021 | Wang | .................... | H04L 69/28 |
| 2022/0029723 A1 * | 1/2022 | Wang | .................... | H04J 3/0667 |
| 2022/0232495 A1 * | 7/2022 | Chai | .................... | H04W 56/001 |
| 2023/0275740 A1 * | 8/2023 | Kwon | .................... | H04J 3/0641 |
| | | | | 370/503 |

FOREIGN PATENT DOCUMENTS

| | | |
|---|---|---|
| CN | 107065688 A | 8/2017 |
| CN | 110267312 A | 9/2019 |
| CN | 111132302 A | 5/2020 |

(Continued)

OTHER PUBLICATIONS

Huawei et al Solution for KI #3B:Exposure of TimeSynchronization 3GPP TSG WG SA2 Meeting#139E 62-2004112, May 22, 2020,total 4 pages.

(Continued)

*Primary Examiner* — Robert J Lopata

(74) *Attorney, Agent, or Firm* — HAUPTMAN HAM, LLP

(57) ABSTRACT

A clock synchronization mode indication method and a communication apparatus. A communication device in a 5G communication system obtains a clock synchronization mode. A session management function network element obtains first indication information, where the first indication information indicates a clock synchronization mode used in a communication system in which a terminal device and a user plane function network element are located. The session management function network element sends the first indication information to the terminal device.

20 Claims, 16 Drawing Sheets

(56) References Cited

FOREIGN PATENT DOCUMENTS

| | | |
|---|---|---|
| CN | 111436113 A | 7/2020 |
| WO | 2018214606 A1 | 11/2018 |
| WO | 2020111995 A1 | 6/2020 |

OTHER PUBLICATIONS

3GPP TS 23.501 V16.5.1 (Aug. 2020), 3rd Generation Partnership Project; Technical Specification Group Services and System Aspects; System architecture for the 5G System (5GS); Stage 2(Release 16), 440 pages.

3GPP TS 23.502 V16.5.1:"3rd Generation Partnership Project; Technical Specification Group Services and System Aspects; Procedures for the 5G System (5GS); Stage 2 (Release 16)",Aug. 2020,594 pages.

3GPP TSG-WG SA2 Meeting #139E e-meeting S2-2003570,KI #3B: Update to Ki #3B to support PTP over UDP/IP, NTT DOCOMO, Sennheiser, BBC, EBU, Nokia, Nokia Shanghai Bell, Qualcomm, Futurewei,Elbonia, Jun. 1-5, 2020,3 pages.

International Search Report issued in corresponding International Application No. PCT/CN2020/108740, mailed Apr. 27, 2021, pp. 1-9.

Extended European Search Report issued in corresponding European Application No. 20949041.6, dated Aug. 24, 2023, pp. 1-8.

Australian Notice of Acceptance issued in corresponding Australian Application No. 2020463350, dated Apr. 17, 2024, pp. 1-3.

NTT DOCOMO et al:"KI #3B, Sol #7: Update for support of PTP over IP", 3GPP TSG-WG SA2 Meeting #139E, e-meeting, Elbonia, Jun. 1-5, 2020, S2-2004649, total 6 pages.

Huawel et al:"Solution for Ki #3B: Exposure of Time Synchronization", 3GPP TSG-WG SA2 Meeting #139E, Elbonia, Jun. 1-12, 2020, S2-2004651, total 5 pages.

CATT:"PTP 1588 support in 5GS/TSN",3GPP TSG-RAN WG2 Meeting #104 Spokane, USA, Nov. 12-16, 2018, R2-1816360, total 7 pages.

Japanese Office Action issued in corresponding Japanese Application No. 2023-510437, dated Mar. 4, 2024, pp. 1-12.

* cited by examiner

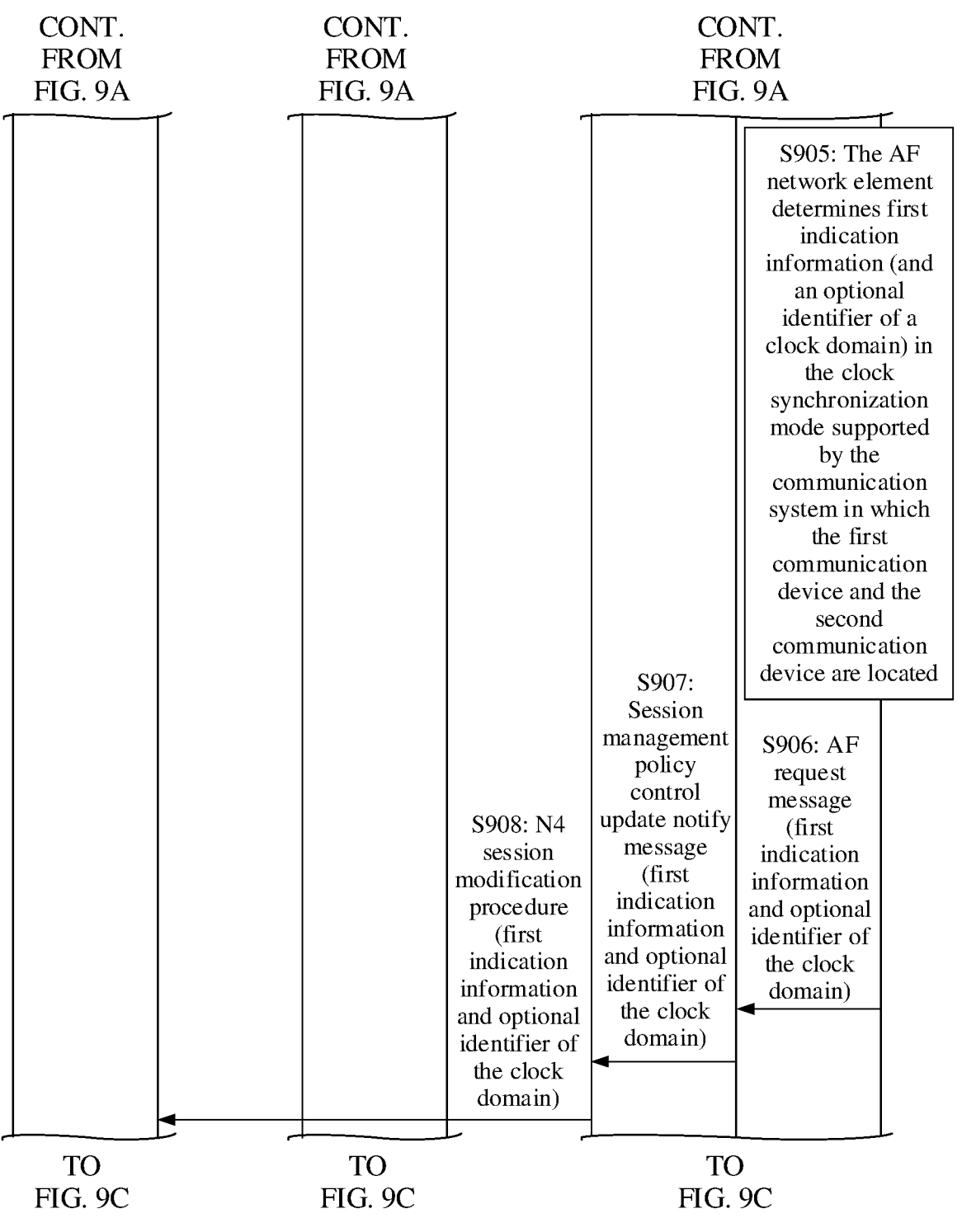

CONT.
FROM
FIG. 9A

CONT.
FROM
FIG. 9A

CONT.
FROM
FIG. 9A

S905: The AF
network element
determines first
indication
information (and
an optional
identifier of a
clock domain) in
the clock
synchronization
mode supported
by the
communication
system in which
the first
communication
device and the
second
communication
device are located S907:
Session
management
policy
control
update notify
message
(first
indication
information
and optional
identifier of
the clock
domain)

S908: N4
session
modification
procedure
(first
indication
information
and optional
identifier of
the clock
domain)

S906: AF
request
message
(first
indication
information
and optional
identifier of
the clock
domain)

CONT.
FROM

FROM

FROM

S909: PDU session modification command
message (first indication information and
optional identifier of the clock domain)

S910: The UPF
network element
processes a PTP packet
based on the first
indication information S911: The
terminal device
processes the
PTP packet
based on the first
indication
information

CLOCK SYNCHRONIZATION MODE INDICATION METHOD AND COMMUNICATION APPARATUS

CROSS-REFERENCE TO RELATED APPLICATIONS

This application is a continuation of International Application No. PCT/CN2020/108740, filed on Aug. 12, 2020, the disclosure of which is hereby incorporated by reference in its entirety.

BACKGROUND

There is a strict clock synchronization requirement in fields such as automobile control and an industrial Internet. When a 5th generation (5th generation, 5G) communication system is used in the fields such as automobile control and the industrial Internet, clock synchronization between a device (for example, a terminal device or a user plane function (user plane function, UPF) network element) in the 5G communication system and another device outside the 5G communication system is implemented based on the IEEE 1588 protocol. However, the IEEE 1588 protocol currently supports a plurality of clock synchronization modes, and different deployment scenarios require that the 5G communication system support different clock synchronization modes. If the 5G communication system uses inconsistent clock synchronization modes, clock synchronization of an industrial network or an automobile control network including the 5G communication system cannot be implemented, and basic communication and control between devices in the network cannot be implemented.

SUMMARY

Embodiments described herein provide a clock synchronization mode indication method and a communication apparatus, so that a communication device in a 5G communication system obtains a clock synchronization mode.

To achieve the foregoing objectives, the following technical solutions are used in embodiments described herein.

According to a first aspect, a clock synchronization mode indication method is provided, and includes: A session management function network element obtains first indication information, where the first indication information indicates a clock synchronization mode used in a communication system in which a terminal device and a user plane function network element are located. The session management function network element sends the first indication information to the terminal device.

According to the clock synchronization mode indication method provided in at least one embodiment, the SMF network element obtains the first indication information, and the first indication information indicates the clock synchronization mode used in the communication system in which the terminal device and the UPF network element are located, so that the terminal device and the UPF network element processes a PTP packet based on the first indication information (in other words, in a different clock synchronization mode), to perform clock synchronization. In this way, a communication device in a 5G communication system obtains the clock synchronization mode.

In at least one embodiment, the method further includes: The session management function network element obtains an identifier of a clock domain, where the identifier of the clock domain and the first indication information indicate a clock synchronization mode used in the clock domain by the communication system in which the terminal device and the user plane function network element are located. The session management function network element sends the identifier of the clock domain to the terminal device. In response to a communication system in which a first communication device and a second communication device are located using a plurality of clock domains, identifiers of the clock domains are used to distinguish between different clock domains.

In at least one embodiment, the method further includes: The session management function network element sends the identifier of the clock domain to the user plane function network element. This implementation is performed in response to the UPF network element not configuring the first indication information and the identifier of the clock domain, so that the UPF network element learns of the specific clock domain corresponding to the first indication information.

In at least one embodiment, the method further includes: The session management function network element sends the first indication information to the user plane function network element. This implementation is performed in response to the UPF network element not configuring the first indication information.

In at least one embodiment, the method further includes: The session management function network element determines fourth indication information based on second indication information and third indication information, where the second indication information indicates a clock synchronization mode supported by the terminal device, the third indication information indicates a clock synchronization mode supported by the user plane function network element, and the fourth indication information indicates a clock synchronization mode supported by a session between the terminal device and the user plane function network element. The session management function network element sends the fourth indication information to an application function network element. The application function network element determines, based on the fourth indication information, the clock synchronization mode supported by the communication system in which the first communication device and the second communication device are located, to further determine the first indication information.

In at least one embodiment, the method further includes: The session management function network element determines fifth indication information based on second indication information and third indication information, where the second indication information indicates a clock synchronization mode supported by the terminal device, the third indication information indicates a clock synchronization mode supported by the user plane function network element, and the fifth indication information indicates a clock synchronization mode supported by the communication system in which the terminal device and the user plane function network element are located. The session management function network element sends the fifth indication information to an application function network element. The application function network element determines the first indication information based on the fifth indication information.

In at least one embodiment, the method further includes: The session management function network element receives the second indication information from the terminal device. This implementation provides an implementation in which the SMF network element obtains the second indication information.

In at least one embodiment, the method further includes: The session management function network element receives the third indication information from the user plane function network element. This implementation provides an implementation in which the SMF network element obtains the third indication information.

In at least one embodiment, that the session management function network element sends the first indication information to the terminal device includes: The session management function network element sends the first indication information to the terminal device in a protocol data unit PDU session establishment procedure. This implementation provides an implementation in which the SMF network element sends the first indication information to the terminal device.

In at least one embodiment, that the session management function network element sends the first indication information to the terminal device includes: The session management function network element sends the first indication information to the terminal device in a PDU session modification procedure. This implementation provides another embodiment in which the SMF network element sends the first indication information to the terminal device.

In at least one embodiment, the clock synchronization mode includes a peer-to-peer transparent clock type, an end-to-end transparent clock type, or a boundary clock type. In other words, a 5GS switching node including the terminal device and the UPF network element uses a clock synchronization mode of a P2P TC, an E2E TC, or a BC.

According to a second aspect, a clock synchronization mode indication method is provided, and includes: A first communication device obtains first indication information, where the first indication information indicates a clock synchronization mode used in a communication system in which the first communication device and a second communication device are located, and the first communication device is a terminal device, and the second communication device is a user plane function network element; or the first communication device is a user plane function network element, and the second communication device is a terminal device. The first communication device processes a precision time protocol PTP packet based on the first indication information.

According to the clock synchronization mode indication method provided in at least one embodiment, the terminal device or the UPF network element obtains the first indication information, and the first indication information indicates the clock synchronization mode used in the communication system in which the terminal device and the UPF network element are located, so that the terminal device and the UPF network element processes the PTP packet based on the first indication information (in other words, in a different clock synchronization mode), to perform clock synchronization. In this way, a communication device in a 5G communication system obtains the clock synchronization mode.

In at least one embodiment, that a first communication device obtains first indication information includes: The first communication device receives the first indication information from a session management function network element. This implementation provides an implementation in which the first communication device obtains the first indication information.

In at least one embodiment, the method further includes: The first communication device obtains an identifier of a clock domain, where the identifier of the clock domain and the first indication information indicate a clock synchronization mode used in the clock domain by the communication system in which the first communication device and the second communication device are located. In response to the communication system in which the first communication device and the second communication device are located using a plurality of clock domains, identifiers of the clock domains are used to distinguish between different clock domains, so that the first communication device and the second communication device learn of a specific clock domain corresponding to the first indication information.

In at least one embodiment, that the first communication device obtains an identifier of a clock domain includes: The first communication device receives the identifier of the clock domain from the session management function network element. This implementation provides an implementation in which the first communication device obtains the identifier of the clock domain.

In at least one embodiment, that the first communication device processes a precision time protocol PTP packet based on the first indication information includes: The first communication device processes the PTP packet based on the identifier of the clock domain and the first indication information. In response to the communication system in which the first communication device and the second communication device are located using the plurality of clock domains, the first communication device processes the PTP packet based on the identifier of the clock domain and the first indication information, so that the first communication device learns of first configuration information of the corresponding clock domain.

In at least one embodiment, the first communication device is the terminal device, and the method further includes: The first communication device sends second indication information to the session management function network element in a protocol data unit PDU session establishment procedure, where the second indication information indicates a clock synchronization mode supported by the first communication device. This implementation provides an implementation in which the terminal device sends the second indication information to the SMF network element.

In at least one embodiment, the first communication device is the terminal device, and the method further includes: The first communication device sends second indication information to an access and mobility management function network element in a registration procedure, where the second indication information indicates a clock synchronization mode supported by the first communication device. In this implementation, the terminal device sends the second indication information to a UDM network element via the AMF network element.

In at least one embodiment, the first communication device is the user plane function network element, and the method further includes: The first communication device sends third indication information to the session management function network element in an N4 association setup procedure, an N4 session establishment procedure, or an N4 session modification procedure, where the third indication information indicates a clock synchronization mode supported by the first communication device. This implementation provides several manners in which the UPF network element sends the third indication information to the SMF network element.

In at least one embodiment, in response to the first indication information indicating that the clock synchronization mode is a peer-to-peer transparent clock type, that the first communication device processes a precision time protocol PTP packet based on the first indication information includes: The first communication device receives the PTP packet from an upstream node that is in the communication system, updates a correction field or a suffix field of the PTP packet based on a PTP link delay between the first communication device and the upstream node, and sends an updated PTP packet to the second communication device, where the PTP packet includes a synchronization packet or a follow up packet corresponding to the synchronization packet, and the suffix field is for updating the correction field. This implementation provides how the UPF network element and the terminal device process the PTP packet in the clock synchronization mode of the peer-to-peer transparent clock type to perform clock synchronization.

In at least one embodiment, the clock synchronization mode includes the peer-to-peer transparent clock type, an end-to-end transparent clock type, or a boundary clock type. In other words, a 5GS switching node including the terminal device and the UPF network element uses a clock synchronization mode of a P2P TC, an E2E TC, or a BC.

According to a third aspect, a communication apparatus is provided, and includes: a processing module, configured to obtain first indication information, where the first indication information indicates a clock synchronization mode used in a communication system in which a terminal device and a user plane function network element are located; and a transceiver module, configured to send the first indication information to the terminal device.

In at least one embodiment, the processing module is further configured to obtain an identifier of a clock domain, where the identifier of the clock domain and the first indication information indicate a clock synchronization mode used in the clock domain by the communication system in which the terminal device and the user plane function network element are located. The transceiver module is further configured to send the identifier of the clock domain to the terminal device.

In at least one embodiment, the transceiver module is further configured to send the identifier of the clock domain to the user plane function network element.

In at least one embodiment, the transceiver module is further configured to send the first indication information to the user plane function network element.

In at least one embodiment, the processing module is further configured to: determine fourth indication information based on second indication information and third indication information, where the second indication information indicates a clock synchronization mode supported by the terminal device, the third indication information indicates a clock synchronization mode supported by the user plane function network element, and the fourth indication information indicates a clock synchronization mode supported by a session between the terminal device and the user plane function network element. The transceiver module is further configured to send the fourth indication information to an application function network element.

In at least one embodiment, the processing module is further configured to: determine fifth indication information based on second indication information and third indication information, where the second indication information indicates a clock synchronization mode supported by the terminal device, the third indication information indicates a clock synchronization mode supported by the user plane function network element, and the fifth indication information indicates a clock synchronization mode supported by the communication system in which the terminal device and the user plane function network element are located. The transceiver module is further configured to send the fifth indication information to an application function network element.

In at least one embodiment, the transceiver module is further configured to receive the second indication information from the terminal device.

In at least one embodiment, the transceiver module is further configured to receive the third indication information from the user plane function network element.

In at least one embodiment, the transceiver module is specifically configured to send the first indication information to the terminal device in a protocol data unit PDU session establishment procedure.

In at least one embodiment, the transceiver module is specifically configured to send the first indication information to the terminal device in a PDU session modification procedure.

In at least one embodiment, the clock synchronization mode includes the peer-to-peer transparent clock type, an end-to-end transparent clock type, or a boundary clock type.

According to a fourth aspect, a first communication apparatus is provided, and includes a processing module, configured to obtain first indication information, where the first indication information indicates a clock synchronization mode used in a communication system in which the first communication apparatus and a second communication apparatus are located, and the first communication apparatus is a terminal device, and the second communication apparatus is a user plane function network element; or the first communication apparatus is a user plane function network element, and the second communication apparatus is a terminal device. The processing module is further configured to process a precision time protocol PTP packet based on the first indication information.

In at least one embodiment, the apparatus further includes a transceiver module, configured to receive the first indication information from a session management function network element.

In at least one embodiment, the processing module is further configured to obtain an identifier of a clock domain, where the identifier of the clock domain and the first indication information indicate a clock synchronization mode used in the clock domain by the communication system in which the first communication apparatus and the second communication apparatus are located.

In at least one embodiment, the apparatus further includes the transceiver module, configured to receive the identifier of the clock domain from the session management function network element.

In at least one embodiment, the processing module is configured to process the PTP packet based on the identifier of the clock domain and the first indication information.

In at least one embodiment, the first communication apparatus is the terminal device, and the first communication apparatus further includes the transceiver module, configured to send second indication information to the session management function network element in a protocol data unit PDU session establishment procedure, where the second indication information indicates a clock synchronization mode supported by the first communication apparatus.

In at least one embodiment, the first communication apparatus is the terminal device, and the first communication apparatus further includes the transceiver module, configured to send second indication information to an access and mobility management function network element in a registration procedure, where the second indication information indicates a clock synchronization mode supported by the first communication apparatus.

In at least one embodiment, the first communication apparatus is the user plane function network element, and the first communication apparatus further includes a transceiver module, configured to send third indication information to the session management function network element in an N4 association setup procedure, an N4 session establishment procedure, or an N4 session modification procedure, where the third indication information indicates a clock synchronization mode supported by the first communication apparatus.

In at least one embodiment, in response to the first indication information indicating that the clock synchronization mode is a peer-to-peer transparent clock type, the first communication apparatus further includes the transceiver module. The transceiver module is configured to receive the PTP packet from an upstream node that is in the communication system. The processing module is configured to update a correction field or a suffix field of the PTP packet based on a PTP link delay between the first communication apparatus and the upstream node. The transceiver module is further configured to send an updated PTP packet to the second communication apparatus, where the PTP packet includes a synchronization packet or a follow up packet corresponding to the synchronization packet, and the suffix field is for updating the correction field.

In at least one embodiment, the clock synchronization mode includes the peer-to-peer transparent clock type, an end-to-end transparent clock type, or a boundary clock type.

According to a fifth aspect, a communication apparatus is provided, and includes a processor. The processor is connected to a memory, the memory is configured to store a computer program, and the processor is configured to execute the computer program stored in the memory, so that the communication apparatus is enabled to perform the method according to any one of the first aspect and the implementations of the first aspect.

According to a sixth aspect, a communication apparatus is provided, and includes a processor. The processor is connected to a memory, the memory is configured to store a computer program, and the processor is configured to execute the computer program stored in the memory, so that the communication apparatus is enabled to perform the method according to any one of the second aspect and the implementations of the second aspect.

According to a seventh aspect, a computer-readable storage medium is provided. The computer-readable storage medium stores a computer program. In response to the computer program being run on a computer, the computer is enabled to perform the method according to any one of the first aspect and the implementations of the first aspect.

According to an eighth aspect, a computer-readable storage medium is provided. The computer-readable storage medium stores a computer program. In response to the computer program being run on a computer, the computer is enabled to perform the method according to any one of the second aspect and the implementations of the second aspect.

According to a ninth aspect, a computer program product including instructions is provided. In response to the instructions being run on a computer or a processor, the computer or the processor is enabled to perform the method according to any one of the first aspect and the implementations of the first aspect.

According to a tenth aspect, a computer program product including instructions is provided. In response to the instructions being run on a computer or a processor, the computer or the processor is enabled to perform the method according to any one of the second aspect and the implementations of the second aspect.

According to an eleventh aspect, a communication system is provided, and includes the communication apparatus according to the third aspect and any one of the third aspect, and the first communication apparatus according to the fourth aspect and any one of the fourth aspect; or include the communication apparatus according to the fifth aspect and the communication apparatus according to the sixth aspect.

For technical effects of the third aspect to the eleventh aspect, refer to the content of the first aspect and the second aspect. Details are not described herein again.

DESCRIPTION OF EMBODIMENTS

Terms such as "component", "module", and "system" used in embodiments described herein indicate computer-related entities. The computer-related entities is hardware, firmware, combinations of hardware and software, software, or software in running. For example, a component is, but is not limited to, a process that is run on a processor, a processor, an object, an executable file, a thread of execution, a program, and/or a computer. In an example, both a computing device and an application that runs on the computing device is components. One or more components reside within a process and/or a thread of execution, and a component is located on one computer and/or distributed between two or more computers. In addition, these components is executed from various computer-readable media that have various data structures. These components communicates by using a local and/or remote process and based on, for example, a signal having one or more data packets (for example, data from one component, where the component interacts with another component in a local system or a distributed system, and/or interacts with other systems via a network such as the Internet via a signal).

Embodiments described herein is applied to a time division duplex (time division duplex, TDD) scenario, and is also applied to a frequency division duplex (frequency division duplex, FDD) scenario.

Embodiments described herein are described by using a scenario of a 5th generation (5th generation, 5G) network in a wireless communication network. The solutions in at least one embodiment is further applied to another wireless communication network, and a corresponding name is also be replaced with a name of a corresponding function in the another wireless communication network.

Figure 1A:
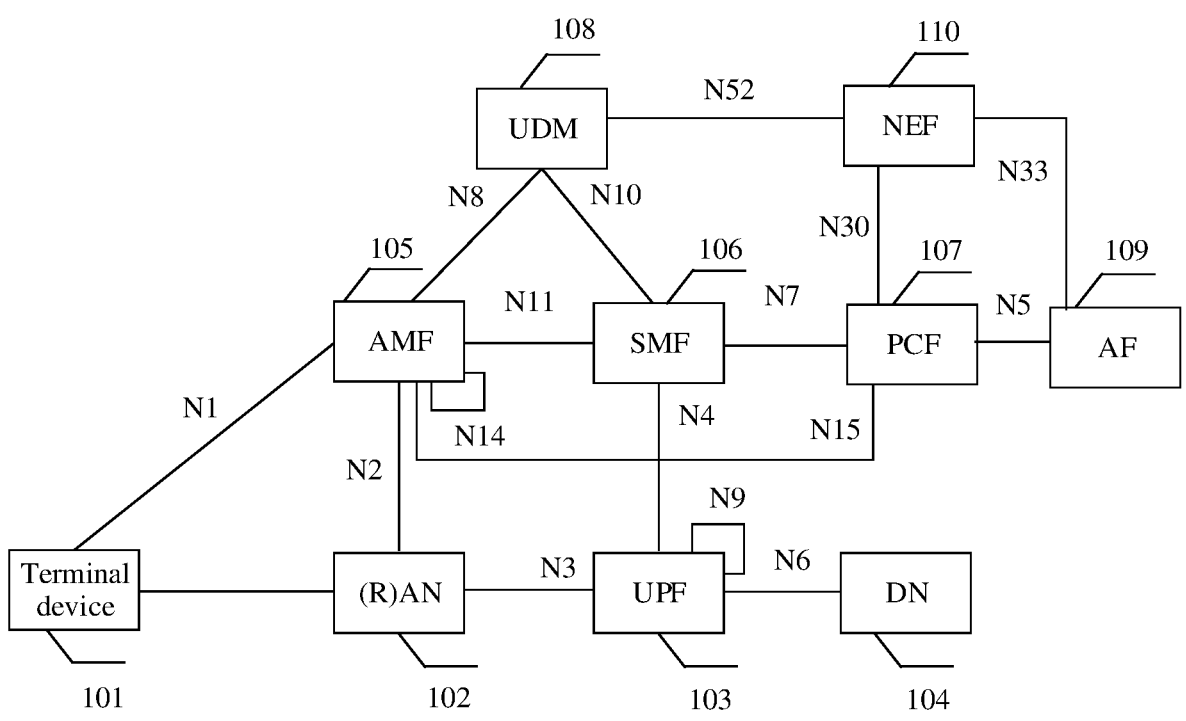
FIG. 1a is a schematic diagram of an architecture of a 5G communication system according to at least one embodiment.

FIG. 1*a* provides a communication system architecture, including a terminal device 101, a (radio) access network ((radio) access network, IAN) network element 102, a user plane function (user plane function, UPF) network element 103, a data network (data network, DN) 104, an access and mobility management function (access and mobility management function, AMF) network element 105, a session management function (session management function, SMF) network element 106, a policy control function (policy control function, PCF) network element 107, a unified data management (unified data management, UDM) network element 108, an application function (application function, AF) network element 109, and a network exposure function (network exposure function, NEF) network element 110.

Names of interfaces between the network elements in FIG. 1*a* are merely examples, and in specific implementation, the interface names is other names. This is not limited. For example, an interface between the terminal device 101 and the AMF network element 105 is an N1 interface, an interface between the RAN network element 102 and the AMF network element 105 is an N2 interface, an interface between the RAN network element 102 and the UPF network element 103 is an N3 interface, an interface between the UPF network element 103 and the SMF network element 106 is an N4 interface, an interface between the PCF network element 107 and the AF network element 109 is an N5 interface, an interface between the UPF network element 103 and the DN 104 is an N6 interface, an interface between the SMF network element 106 and the PCF network element 107 is an N7 interface, an interface between the AMF network element 105 and the UDM network element 108 is an N8 interface, an interface between the UPF network element 103 and the UPF network element 103 is an N9 interface, an interface between the SMF network element 106 and the UDM network element 108 is an N10 interface, In interface between the AMF network element 105 and the SMF network element 106 is an N11 interface, an interface between the UDM network element 108 and the NEF network element 110 is an N52 interface, an interface between the NEF network element 110 and the PCF network element 107 is an N30 interface, and an interface between the NEF network element 110 and the AF network element 109 is an N33 interface.

The terminal device 101 is also referred to as user equipment (user equipment, UE), a mobile station (mobile station, MS), a mobile terminal (mobile terminal, MT), or the like, and is a device that provides voice and/or data connectivity for a user. For example, the terminal device 101 is a handheld device or a vehicle-mounted device that has a wireless connection function. Currently, for example, the terminal device is a mobile phone (mobile phone), a tablet, a notebook computer, a palmtop computer, a mobile internet device (mobile internet device, MID), a wearable device, a virtual reality (virtual reality, VR) device, an augmented reality (augmented reality, AR) device, a wireless terminal in industrial control (industrial control), a wireless terminal in self driving (self driving), a wireless terminal in remote medical surgery (remote medical surgery), a wireless terminal in a smart grid (smart grid), a wireless terminal in transportation safety (transportation safety), a wireless terminal in a smart city (smart city), or a wireless terminal in a smart home (smart home).

The RAN network element 102 is a device that provides wireless access for the terminal device 101, and includes but is not limited to a next generation radio access network (next generation RAN, NG-RAN), a next generation NodeB (gNodeB, gNB), a wireless fidelity (wireless fidelity, Wi-Fi) access point, a world interoperability for microwave access (world interoperability for microwave access, WiMAX) base station, and the like.

The UPF network element 103 is mainly responsible for processing a user packet, such as forwarding and charging for the user packet.

The DN 104 refers to a carrier network that provides a data transmission service for a user, such as an IP multimedia service (IP multimedia service, IMS) or the Internet (Internet). The terminal device 101 accesses the DN 104 by establishing a protocol data unit (protocol data unit, PDU) session (session) between the terminal device 101, the RAN network element 102, the UPF network element 103, and the DN 104.

The AMF network element 105 is mainly responsible for mobility management in a mobile network, such as user position update, registration of a user with a network, and user switching.

The SMF network element 106 is mainly responsible for session management in a mobile network, such as session establishment, modification, and release. A specific function is, for example, allocating an internet protocol (internet protocol, IP) address to a user, or selecting a UPF network element that provides a packet forwarding function.

The PCF network element 107 is responsible for providing a policy, such as a QoS policy or a slice selection policy, for the AMF network element and the SMF network element.

The UDM network element 108 is configured to store user data such as subscription information and authentication/authorization information.

The AF network element 109 is also referred to as a server, and is responsible for providing a service for the 3GPP network, for example, affecting service routing, and interacting with the PCF network element to perform policy control.

The NEF network element 110 is responsible for isolating internal and external networks, and is used for network capability exposure, including an exposure monitoring (Monitoring) capability, a policy/charging capability, an analysis reporting capability, and the like.

Figure 1B:
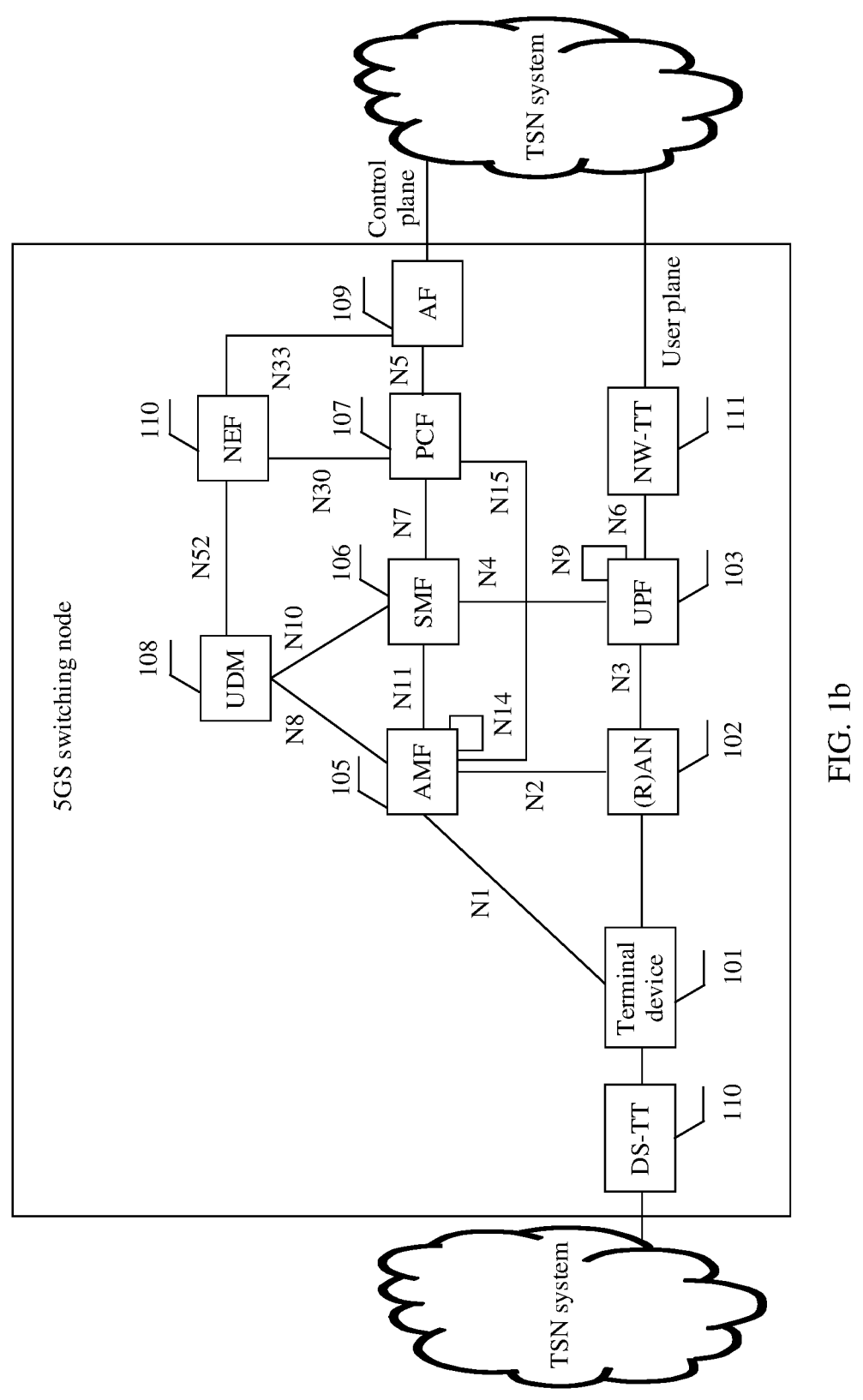
FIG. 1b is a schematic architectural diagram of a TSN network according to at least one embodiment.

A 5G system (5G system, 5GS) defines a TSN network architecture shown in FIG. 1*b* to support interworking with a time sensitive network (time sensitive network, TSN) system (System). The TSN system is based on layer 2 transmission, and includes a TSN switching node (which is also referred to as a TSN Bridge) and a TSN endpoint (end station or endpoint). The 5GS is simulated as a TSN switching node to implement functions of the TSN switching node, to implement end-to-end deterministic transmission on a TSN network that includes the 5GS and the TSN system. To be different from an existing TSN switching node, the switching node simulated by the 5GS is referred to as a 5GS switching node.

The AF network element adapts information about the 5GS to information about the TSN switching node, interacts with a centralized user configuration (centralized user configuration, CNC) of the TSN system, and sends, to a user plane function device of the 5GS switching node via a control plane function network element (such as a PCF network element or an SMF network element) of the 5GS switching node, configuration information that is delivered by the CNC for the 5GS switching node. A device-side TSN translator (device-side TSN translator, DS-TT) 110 and a network-side TSN translator (network-side TSN translator, NW-TT) 111 are logical function devices of a 5GS user plane, and are configured to implement an external feature of the TSN switching node, for example, topology discovery and CNC scheduling rule implementation. The DS-TT is deployed together with a terminal device, or is deployed independently. Similarly, the NW-TT is deployed together with a UPF network element, or is deployed independently.

In addition to the TSN system, the 5GS communicates with other industrial systems to form an industrial network. These industrial systems also supports industrial communication protocols other than a TSN, for example, the process field net (process field net, Profinet) protocol and the ethernet for control automation technology (Ethernet for control automation technology, EtherCAT) protocol. In this case, the 5GS is simulated as a switching node in the industrial network, and performs clock synchronization with the other industrial systems that are in the industrial network. A protocol supporting manner of the 5GS is similar to that of the TSN, and a switching node simulated by the 5GS is referred to as a 5GS switching node.

Figure 1C:
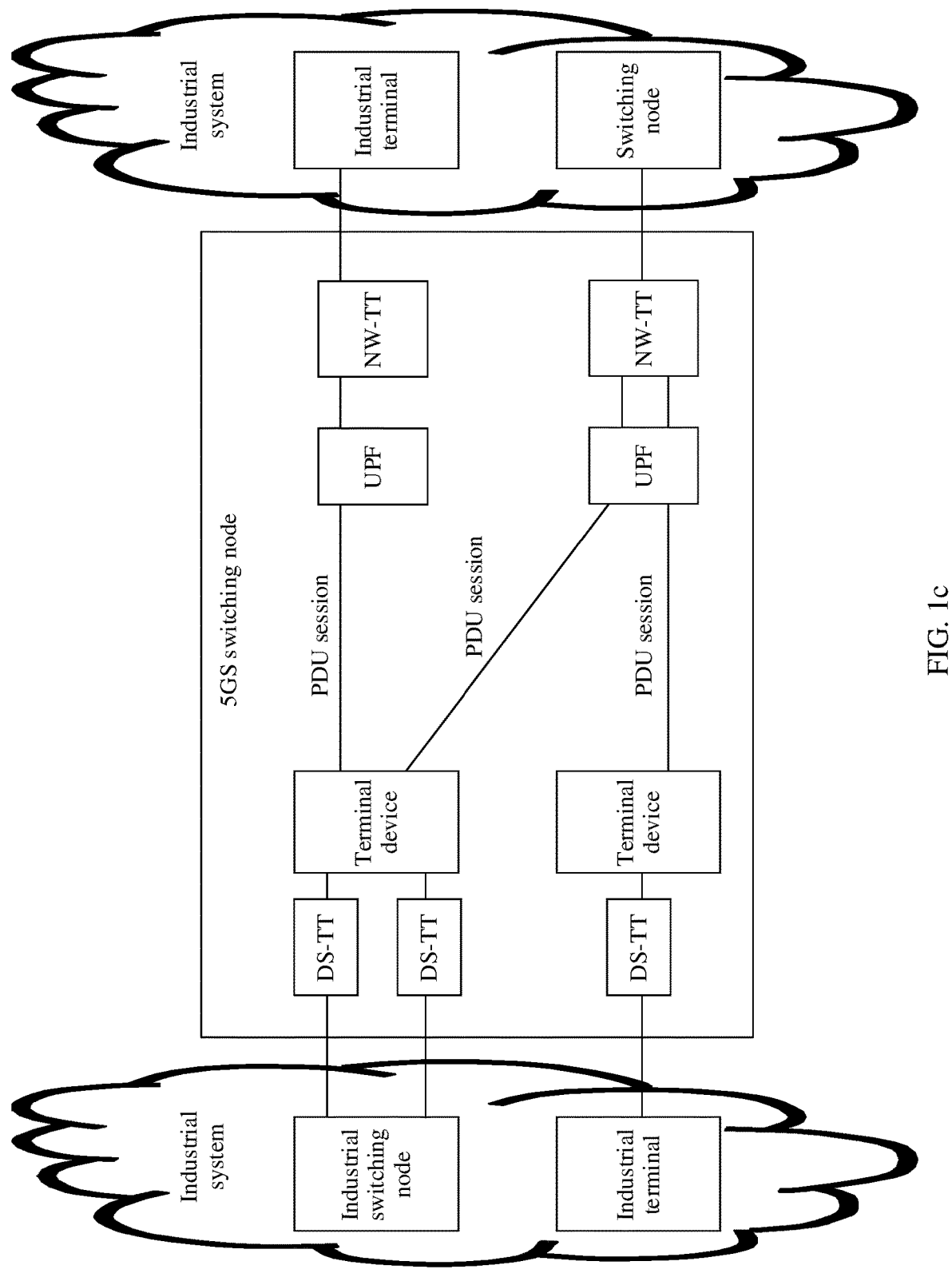
FIG. 1c is a schematic architectural diagram of an industrial network according to at least one embodiment.

As shown in FIG. 1c, at least one embodiment provides an architecture of an industrial network, including a 5GS switching node and another industrial system (for example, an industrial switching node or an industrial terminal) that is in the industrial network. On a user plane, each 5GS switching node includes at least a terminal device and a UPF network element, and further includes a RAN network element (not shown in the figure) used for communication between the terminal device and the UPF network element, and optionally, further includes one or more DS-TTs and NW-TTs. The DS-TT and NW-TT are responsible for protocol conversion and interworking between a 5GS and another industrial network. One 5GS switching node includes one or more PDU sessions. In response to one 5GS switching node including a plurality of PDU sessions, the plurality of PDU sessions is a plurality of PDU sessions of one terminal device, or is a plurality of PDU sessions of different terminal devices.

In at least one embodiment, the UPF network element is integrated with the NW-TT, and the terminal device is integrated with the DS-TT. Descriptions of the UPF network element in the following is also replaced with those of the NW-TT, and descriptions of the terminal device in the following is also replaced with those of the DS-TT.

A common clock synchronization protocol is the IEEE 1588 protocol. The 1588 protocol is also referred to as the precision time protocol (precise time protocol, PTP). PTP packets (also referred to as PTP messages) used to implement clock synchronization include the following two types:

an event packet, where an accurate timestamp is to be recorded in response to the packet being received and sent, and the packet includes a synchronization (Sync) packet, a delay request (Delay_Req) packet, a peer delay request (Pdelay_Req) packet, and a peer delay request response (Pdelay_Resp) packet; and a general packet, where an accurate timestamp is not recorded in response to the packet being received and sent, and the packet includes an announce (Announce) packet, a follow up (Follow_Up) packet, a delay request response (Delay_Resp) packet, a peer delay request response follow up (Pdelay_Resp_Follow_Up) packet, a management packet, and a signaling packet.

The PTP has two types of clocks: a one-step (one-step) clock and a two-step (two-step) clock. For the one-step clock, a synchronization (Sync) packet carries a timestamp generated in response to the packet leaving a master (Master) node, and a follow up (Follow_Up) packet not being used. For the two-step clock, a synchronization (Sync) packet does not carry a timestamp generated in response to the packet leaving a master node, and a follow up (Follow_Up) packet corresponding to the synchronization packet carrying the timestamp. For the one-step clock, a peer delay request response (Pdelay_Resp) packet carries the timestamp generated in response to the packet leaving the master node, and a peer delay request response follow up (Pdelay_Resp_Follow_Up) packet not being used. For the two-step clock, a peer delay request response (Pdelay_Resp) packet does not carry the timestamp generated in response to the packet leaving the master node, and the timestamp being carried in a peer delay request response follow up (Pdelay_Resp_Follow_Up) packet.

The 1588 protocol supports five types of nodes in different clock synchronization modes: an ordinary clock (ordinary clock, OC) node, a border clock (border clock, BC) node, an end-to-end transparent clock (end-to-end transparent clock, E2E TC) node, a peer-to-peer transparent clock (peer-to-peer transparent clock, P2P TC) node, and a management node. The five node types are also referred to as five PTP device types (PTP device types).

The BC node is a node that supports a clock synchronization mode of BC, and has a plurality of PTP ports in a same clock domain for clock synchronization. The BC node performs clock synchronization with an upstream node through one port and advertises time to a downstream node through another port. In addition, a node that supports this type also functions as a clock source and advertise time to downstream nodes through a plurality of PTP ports.

The E2E TC node does not perform clock synchronization with another node. The E2E TC node only forwards a PTP packet between a plurality of ports and corrects a forwarding delay of the E2E TC node based on residence time of a synchronization (Sync) packet in the PTP protocol on the E2E TC node. The E2E TC node does not perform clock synchronization through any port or calculate a delay of each link segment.

The P2P TC node directly forwards a synchronization (Sync) packet, a follow up (Follow_Up) packet, and an announce (Announce) packet, but does not forward other PTP packets, and also participates in calculation of a delay of each link segment on an entire link. The P2P TC node measures the delay of each link segment in a peer delay (Peer Delay) measurement mechanism.

For a one-step (one-step) P2P TC node, the link delay is added to a correction field (correctionField) in the synchronization (Sync) packet, in other words, a value of the correction field (correctionField) in the synchronization (Sync) packet plus a value of the link delay is used as a value of a new correction field (correctionField), and the correction field (correctionField) in the synchronization (Sync) packet is updated. On an egress port of the P2P TC node, residence time of the synchronization (Sync) packet in the P2P TC node is added to the correction field (correctionField) in the synchronization (Sync) packet, in other words, the value of the correction field (correctionField) in the synchronization (Sync) packet plus a value of the residence time of the synchronization (Sync) packet in the P2P TC node is used as a value of a new correction field (correctionField), and the correction field (correctionField) in the synchronization (Sync) packet is updated. Before the value of the link delay or the value of the residence time is added to the value of the correction field (correctionField), a unit and number system of the link delay or residence time is to be converted into a same unit and number system of the correction field (correctionField). For example, the unit is converted into nanosecond, and the number system is converted into hexadecimal.

For a two-step (two-step) P2P TC node, the link delay is added to a correction field (correctionField) in the follow up (Follow_Up) packet corresponding to the synchronization (Sync) packet, in other words, a value of the correction field (correctionField) in the follow up (Follow_Up) packet corresponding to the synchronization (Sync) packet plus a value of the link delay is used as a value of a new correction field (correctionField), and the correction field (correctionField) in the follow up (Follow_Up) packet corresponding to the synchronization (Sync) packet is updated. On an egress port of the P2P TC node, residence time of the synchronization (Sync) packet in the P2P TC node is added to the correction field (correctionField) in the follow up (Follow_Up) packet, in other words, the value of the correction field (correctionField) in the follow up (Follow_Up) packet corresponding to the synchronization (Sync) packet plus a value of the residence time of the synchronization (Sync) packet in the P2P TC node is used as a value of a new correction field (correctionField), and the correction field (correctionField) in the follow up (Follow_Up) packet corresponding to the synchronization (Sync) packet is updated. Similarly, before the value of the link delay or the value of the residence time is added to the value of the correction field (correctionField), a unit and number system of the link delay or residence time is converted into a same unit and number system of the correction field (correctionField). For example, the unit is converted into nanosecond, and the number system is converted into hexadecimal.

Figures 2, 3:
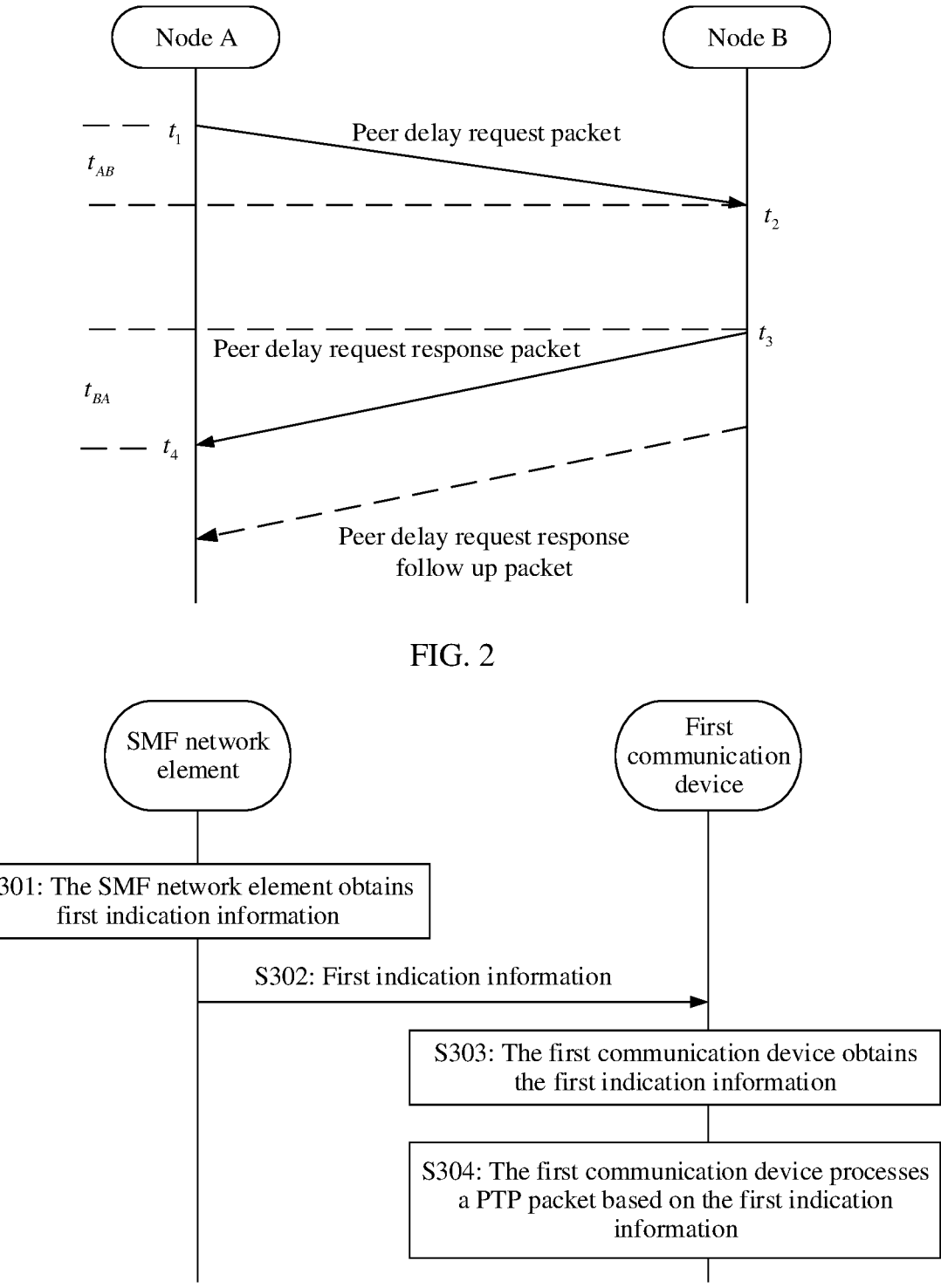
FIG. 2 is a schematic diagram of an end delay measurement mechanism according to at least one embodiment.
FIG. 3 is a schematic diagram 1 of a clock synchronization mode indication method according to at least one embodiment.

FIG. 2 shows the peer delay (Peer Delay) measurement mechanism. Node A and node B transfer timestamp information to each other based on a peer delay request (Pdelay_Req) packet, a peer delay request response (Pdelay_Resp) packet, or a peer delay request response follow up (Pdelay_Resp_Follow_Up) packet, so as to obtain a link delay $T_L$ between node A and node B. $T_L=((t_2-t_1)+(t_4-t_3))/2$, where $t_1$ is time in response to the peer delay request (Pdelay_Req) packet leaving a port of node A; $t_2$ is time in response to a port of node B receiving the peer delay request (Pdelay_Req) packet; $t_3$ is time in response to the peer delay request response (Pdelay_Resp) packet leaving a port of node B; and $t_4$ is time in response to a port of node A receiving the peer delay request response (Pdelay_Resp) packet. For the one-step clock, the peer delay request response follow up (Pdelay_Resp_Follow_Up) packet is not used, and $t_2$ and $t_3$ are carried in the peer delay request response (Pdelay_Resp) packet. For the two-step clock, $t_2$ and $t_3$ are carried in the peer delay request response follow up (Pdelay_Resp_Follow_Up) packet.

The OC node provides only one port that supports the 1588 protocol. The port is only a master (master) port or a slave (slave) port. In this way, the OC node is used only as a node on a device side and cannot be used as an intermediate node in a synchronization domain.

The management node is a node that has a capability of processing a PTP management message and is used together with a node that supports a BC, an OC, an E2E TC, or a P2P TC. In other words, a node supports a clock synchronization mode of the BC, OC, E2E TC, or P2P TC, and also has a capability of the management node.

Differences between the clock synchronization modes of the E2E TC, P2P TC, and BC are as follows.

In response to a node being in the E2E TC mode, a local clock is not calibrated, and only the correction field (correctionField) in the synchronization (Sync) packet or the correction field (correctionField) in the follow up (Follow_Up) packet corresponding to the synchronization (Sync) packet is to be modified based on residence time of the synchronization (Sync) packet on the node.

In response to a node being in the P2P TC mode, a local clock is not calibrated, and only the correction field (correctionField) in the synchronization (Sync) packet or the correction field (correctionField) in the follow up (Follow_Up) packet corresponding to the synchronization (Sync) packet is to be modified based on residence time of the synchronization (Sync) packet on the node and a measured link delay between the node and a peer node.

In response to a node is in the BC mode, after receiving the synchronization (Sync) packet from a previous-hop master node, the node calibrates a local clock to perform clock synchronization with the master node. In addition, the node, as a master node, generates a new synchronization (Sync) packet and sends the packet to a next-hop slave node, so that the next-hop slave node performs clock synchronization with the node.

In a scenario in which a 5GS switching node including a terminal device, a UPF network element, and the like in a 5GS is still located in another communication system, and is to perform clock synchronization with a communication device that is in the another communication system, at least one embodiment provides a clock synchronization mode indication method. An SMF network element sends first indication information to the terminal device (optionally, further sends the first indication information to the UPF network element). The first indication information indicates a clock synchronization mode used in a communication system in which the terminal device and the UPF network element are located. In this way, the terminal device and the UPF network element processes a precision time protocol (precision time protocol, PTP) packet based on the first indication information, to implement clock synchronization in the communication system.

As shown in FIG. 3, at least one embodiment provides a clock synchronization mode indication method, including the following steps.

S301: An SMF network element obtains first indication information.

The first indication information indicates a clock synchronization mode used in a communication system in which a first communication device and a second communication device are located. The first communication device is a terminal device, and the second communication device is a UPF network element; or the first communication device is a UPF network element, and the second communication device is a terminal device. In other words, the first indication information indicates a clock synchronization mode used in a communication system in which the terminal device and the UPF network element are located.

As shown in FIG. 1*b* or FIG. 1*c*, the communication system in which the first communication device and the second communication device (namely, the terminal device and the UPF network element) are located refers to a 5GS switching node including the first communication device and the second communication device (namely, the terminal device and the UPF network element).

The clock synchronization mode includes the peer-to-peer transparent clock (P2P TC) type, the end-to-end transparent clock (E2E TC) type, and the boundary clock (BC) type mentioned above. In other words, the SMF network element learns of a clock synchronization mode, of a P2P TC, an E2E TC, or a BC, that is currently used by the 5GS switching node including the terminal device and the UPF network element.

Optionally, In response to the communication system in which the first communication device and the second communication device are located using a plurality of clock domains, the SMF network element further obtains a clock domain identifier (Clock Domain ID). The identifier of a clock domain and the first indication information indicate a clock synchronization mode used in the clock domain by the communication system in which the first communication device and the second communication device are located. In other words, the identifier of the clock domain and the first indication information indicate the clock synchronization mode used in the specific clock domain by the communication system in which the terminal device and the UPF network element are located.

The clock domain is also referred to as a PTP domain. One PTP domain includes a plurality of PTP devices, and these devices communicate with each other based on a protocol specification. One PTP device joins a plurality of clock domains, and each clock domain is distinguished by using an identifier of the clock domain. Both the 5GS switching node and the switching node in the industrial network in FIG. 1*c* is used as PTP devices, and generate or process a PTP packet according to the 1588 protocol or the PTP protocol.

A PTP device processes PTP messages from a plurality of clock domains independently. In other words, the PTP device supports different clock synchronization modes in different clock domains (in other words, the PTP device functions as a node that supports different clock synchronization modes). Therefore, in response to the communication system (namely, the 5GS switching node) in which the first communication device and the second communication device are located supporting a plurality of clock domains, the identifier of the clock domain and the first indication information jointly indicate the clock synchronization mode used in the communication system. The first communication device and the second communication device determines the identifier of the clock domain based on a domain number (domainNumber) carried in the PTP packet.

The following describes how the SMF network element obtains the first indication information (and the optional identifier of the clock domain).

In at least one embodiment, the SMF network element configures or stores the first indication information (and the optional identifier of the clock domain) in advance. To be specific, the SMF network element configures a clock synchronization mode used by the 5GS switching node for each clock domain, and the SMF network element obtains the first indication information (and the optional identifier of the clock domain) by querying configuration information.

In at least one embodiment, the SMF network element obtains the first indication information (and the optional identifier of the clock domain) from an AF network element via a PCF network element. For how the AF network element determines the first indication information (and the optional identifier of the clock domain), refer to descriptions in FIG. 4.

For example, the SMF network element obtains the first indication information (and the optional identifier of the clock domain) from the AF network element via the PCF network element. For example, the AF network element sends the first indication information (and the optional identifier of the clock domain) to the PCF network element based on an AF request message. In one manner, the AF network element directly sends the AF request message to the PCF network element, and the SMF network element obtains the first indication information (and the optional identifier of the clock domain) from the PCF network element. In another manner, the AF network element sends the AF request message to an NEF network element, the NEF network element forwards the AF request message to the PCF network element, and the SMF network element obtains the first indication information (and the optional identifier of the clock domain) from the PCF network element.

In still at least one embodiment, the UPF network element configures or stores the first indication information (and the optional identifier of the clock domain) in advance. To be specific, the UPF network element configures a clock synchronization mode used by the 5GS switching node for each clock domain, and the SMF network element obtains the first indication information (and the optional identifier of the clock domain) from the UPF network element. In one manner, the UPF network element sends the first indication information (and the optional identifier of the clock domain) to the SMF network element in an N4 association setup procedure, an N4 session establishment procedure, or an N4 session modification procedure. Correspondingly, the SMF network element obtains the first indication information (and the optional identifier of the clock domain) from the UPF network element in the N4 association setup procedure, the N4 session establishment procedure, or the N4 session modification procedure.

For example, for the N4 association setup procedure, the SMF network element sends an N4 association setup request (N4 Association Setup Request) message to the UPF network element, and the UPF network element sends an N4 association setup response (N4 Association Setup Response) message to the SMF network element. The message includes the first indication information (and the optional identifier of the clock domain).

For example, for the N4 session establishment procedure, the SMF network element sends an N4 session establishment request (N4 Session Establishment Request) message to the UPF network element, and the UPF network element sends an N4 session establishment response (N4 Session Establishment Response) message to the SMF network element. The message includes the first indication information (and the optional identifier of the clock domain).

For example, for the N4 session modification procedure, the SMF network element sends an N4 session modification request (N4 Session Modification Request) message to the UPF network element, and the UPF network element sends an N4 session modification response (N4 Session Modification Response) message to the SMF network element. The message includes the first indication information (and the optional identifier of the clock domain).

In yet at least one embodiment, a UDM network element configures or stores the first indication information (and the optional identifier of the clock domain) in advance. To be specific, the UDM network element configures a clock synchronization mode used by the 5GS switching node for each clock domain, and the SMF network element obtains the first indication information (and the optional identifier of the clock domain) from the UDM network element. In one manner, the SMF network element obtains the first indication information (and the optional identifier of the clock domain) from the UDM network element in a PDU session establishment procedure.

The SMF network element sends a subscription data management get (Nudm_SDM_Get) request message to the UDM network element, and the UDM network element sends a subscription data management get (Nudm_SDM_Get) response message to the SMF network element. The message includes the first indication information (and the optional identifier of the clock domain).

S302: The SMF network element sends the first indication information to the first communication device.

Correspondingly, the first communication device receives the first indication information from the SMF network element.

Optionally, the SMF network element further sends the identifier of the clock domain to the first communication device, and correspondingly, the first communication device receives the identifier of the clock domain from the session management function network element.

In at least one embodiment, the first communication device is the terminal device, and the SMF network element sends the first indication information (and the optional identifier of the clock domain) to the terminal device. Correspondingly, the terminal device receives the first indication information (and the optional identifier of the clock domain) from the SMF network element. In one manner, the SMF network element sends the first indication information (and the optional identifier of the clock domain) to the terminal device in the PDU session establishment procedure. Correspondingly, the terminal device receives the first indication information (and the optional identifier of the clock domain) from the SMF network element in the PDU session establishment procedure. In another manner, the SMF network element sends the first indication information (and the optional identifier of the clock domain) to the terminal device in a PDU session modification procedure. Correspondingly, the terminal device receives the first indication information (and the optional identifier of the clock domain) from the SMF network element in the PDU session modification procedure.

For example, for the PDU session establishment procedure, the terminal device sends a PDU session establishment request (PDU Session Establishment Request) message to the SMF network element, and the SMF network element sends a PDU session establishment accept (PDU Session Establishment Accept) message to the terminal device. The message includes the first indication information (and the optional identifier of the clock domain).

For example, for the PDU session modification procedure, the terminal device sends a PDU session modification request (PDU Session Modification Request) message to the SMF network element, and the SMF network element sends a PDU session modification command (PDU Session Modification Command) message to the terminal device. The message includes the first indication information (and the optional identifier of the clock domain).

In at least one embodiment, the first communication device is the UPF network element, and the SMF network element sends the first indication information (and the optional identifier of the clock domain) to the UPF network element. Correspondingly, the UPF network element receives the first indication information (and the optional identifier of the clock domain) from the SMF network element. The SMF network element sends the first indication information to the UPF network element in the N4 association setup procedure, the N4 session establishment procedure, or the N4 session modification procedure. Correspondingly, the UPF network element receives the first indication information from the SMF network element in the N4 association setup procedure, the N4 session establishment procedure, or the N4 session modification procedure.

For example, for the N4 association setup procedure, the SMF network element sends an N4 association setup request message to the UPF network element, where the message includes the first indication information (and the optional identifier of the clock domain), and the UPF network element sends an N4 association setup response message to the SMF network element.

For example, for the N4 session establishment procedure, the SMF network element sends an N4 session establishment request message to the UPF network element, where the message includes the first indication information (and the optional identifier of the clock domain). The UPF network element sends an N4 session establishment response message to the SMF network element.

For example, for the N4 session modification procedure, the SMF network element sends an N4 session modification request message to the UPF network element, where the message includes the first indication information (and the optional identifier of the clock domain). The UPF network element sends an N4 session modification response message to the SMF network element.

In response to the UPF network element configuring or storing the first indication information (and the optional identifier of the clock domain) in advance, and in step S301, the SMF network element obtains the first indication information (and the optional identifier of the clock domain) from the UPF network element, the SMF network element does not send the first indication information (or the optional identifier of the clock domain) to the UPF network element in step S302.

S303: The first communication device obtains the first indication information.

Optionally, the first communication device further obtains the identifier of the clock domain.

As described in step S302, in response to the first communication device being the UPF network element, the UPF network element configures or stores the first indication information (and the optional identifier of the clock domain) in advance. The UPF network element obtains the first indication information (and the optional identifier of the clock domain) by querying a configuration.

In another case, for example, the first communication device is the terminal device, or the first communication device is the UPF network element but does not configure or store the first indication information (or the optional identifier of the clock domain) in advance, the first communication device receives the first indication information (and the optional identifier of the clock domain) from the SMF network element.

S304: The first communication device processes the PTP packet based on the first indication information.

For the PTP packet, refer to the foregoing descriptions.

In response to the communication system in which the first communication device and the second communication device are located using one clock domain, the first communication device directly processes the PTP packet based on the first indication information.

Optionally, in response to the communication system in which the first communication device and the second communication device are located using a plurality of clock domains, the first communication device processes the PTP packet based on the identifier of the clock domain and the first indication information. In other words, after receiving the PTP packet, the first communication device matches the identifier of the clock domain based on the domain number (domainNumber) in the PTP packet, to determine, based on the first indication information, the clock synchronization mode used in the clock domain.

In at least one embodiment, in response to the first indication information indicating that the clock synchronization mode is the peer-to-peer transparent clock (P2P TC) type, the first communication device (which is used as a slave node for clock synchronization in this case) receives a PTP packet from an upstream node (which is also referred to as a previous-hop node or a master node) that is in the communication system, and updates a correction field (correctionField) or a suffix field (Suffix Field) of the PTP packet based on a PTP link delay between the first communication device and the upstream node. The first communication device (which is used as a master node for clock synchronization in this case) sends an updated PTP packet to the second communication device (which is used as a slave node for clock synchronization in this case), where the PTP packet includes a synchronization (Sync) packet or a follow up (Follow UP) packet corresponding to the synchronization (Sync) packet, and a suffix field (Suffix Field) is for updating a correction field (correctionField).

In response to the first communication device updating the suffix field (Suffix Field) of the PTP packet, after receiving the updated PTP packet, the second communication device updates the correction field (correctionField) of the PTP packet based on the suffix field (Suffix Field) and residence time of the synchronization (Sync) packet in a 5G communication system. In response to there being a downstream node (which is also referred to as a next-hop node or a slave node) of the communication system, the second communication device sends an updated PTP packet to the downstream node of the communication system.

In response to the first communication device updating the correction field (correctionField) of the PTP packet, after receiving the updated PTP packet, the second communication device updates the correction field (correctionField) of the PTP packet based on residence time of the synchronization (Sync) packet in a 5G communication system.

In at least one embodiment, in response to the first indication information indicating that the clock synchronization mode is the end-to-end transparent clock (E2E TC) type, the first communication device receives a synchronization (Sync) packet sent by an upstream node, records precise time $t_a$ of receiving the synchronization (Sync) packet, includes the time in a suffix field (Suffix Field) of the synchronization (Sync) packet, and sends the time to the second communication device, or the first communication device includes the time in a suffix field (Suffix Field) of a follow up (Follow Up) packet corresponding to the synchronization (Sync) packet, and sends the time to the second communication device. The second communication device records precise time $t_b$ of receiving the synchronization (Sync) packet, calculates residence time $(t_b\text{-}t_a)$ of the synchronization (Sync) packet in the communication system, adds the residence time to a correction field (correctionField) of the synchronization (Sync) packet or the follow up (Follow Up) packet corresponding to the synchronization (Sync) packet, and deletes $t_a$ carried in the suffix field (Suffix Field).

In this case, the adding the residence time to a correction field (correctionField) of the synchronization (Sync) packet or the follow up (Follow Up) packet corresponding to the synchronization (Sync) packet refers to increasing a value of the correction field (correctionField) of the synchronization (Sync) packet by a value of the residence time as a value of a new correction field (correctionField), and updating the correction field (correctionField) of the synchronization (Sync) packet; or increasing a value of the correction field (correctionField) of the follow up (Follow Up) packet corresponding to the synchronization (Sync) packet by a value of the residence time as a value of a new correction field (correctionField), and updating the correction field (correctionField) of the follow up (Follow Up) packet.

In still at least one embodiment, in response to the first indication information indicating that the clock synchronization mode is the boundary clock (BC) type, the first communication device receives a synchronization (Sync) packet sent by an upstream node, records precise time $t_a$ of receiving the synchronization (Sync) packet, includes the time in a suffix field (Suffix Field) of the synchronization (Sync) packet, and sends the time to the second communication device, or the first communication device includes the time in a suffix field (Suffix Field) of a follow up (Follow Up) packet corresponding to the synchronization (Sync) packet, and sends the time to the second communication device. The second communication device records precise time to of receiving the synchronization (Sync) packet, and calculates residence time $(t_b\text{-}t_a)$ of the synchronization (Sync) packet in the communication system, and the second communication device obtains a frequency ratio (rateRatio) in the synchronization (Sync) packet or the follow up (Follow Up) packet corresponding to the synchronization (Sync) packet, converts the residence time based on the frequency ratio (rateRatio) (that is, rateRatio*$(t_b\text{-}t_a)$), and adds the converted residence time to the correction field (correctionField) of the synchronization (Sync) packet or the follow up (Follow Up) packet corresponding to the synchronization (Sync) packet.

In this case, the adding the converted residence time to the correction field (correctionField) of the synchronization (Sync) packet or the follow up (Follow Up) packet corresponding to the synchronization (Sync) packet refers to increasing a value of the correction field (correctionField) of the synchronization (Sync) packet by a value of the converted residence time as a value of a new correction field (correctionField), and updating the correction field (correctionField) of the synchronization (Sync) packet; or increasing a value of the correction field (correctionField) of the follow up (Follow Up) packet corresponding to the synchronization (Sync) packet by a value of the converted residence time as a value of a new correction field (correctionField), and updating the correction field (correctionField) of the follow up (Follow Up) packet.

According to the clock synchronization mode indication method provided in at least one embodiment, the SMF network element obtains the first indication information, and the first indication information indicates the clock synchronization mode used in the communication system in which the terminal device and the UPF network element are located, so that the terminal device and the UPF network element processes the PTP packet based on the first indication information (in other words, in a different clock synchronization mode), to perform clock synchronization. In this way, a communication device in the 5G communication system obtains the clock synchronization mode.

The following describes the clock synchronization mode indication method with reference to a specific procedure.

Figure 4:
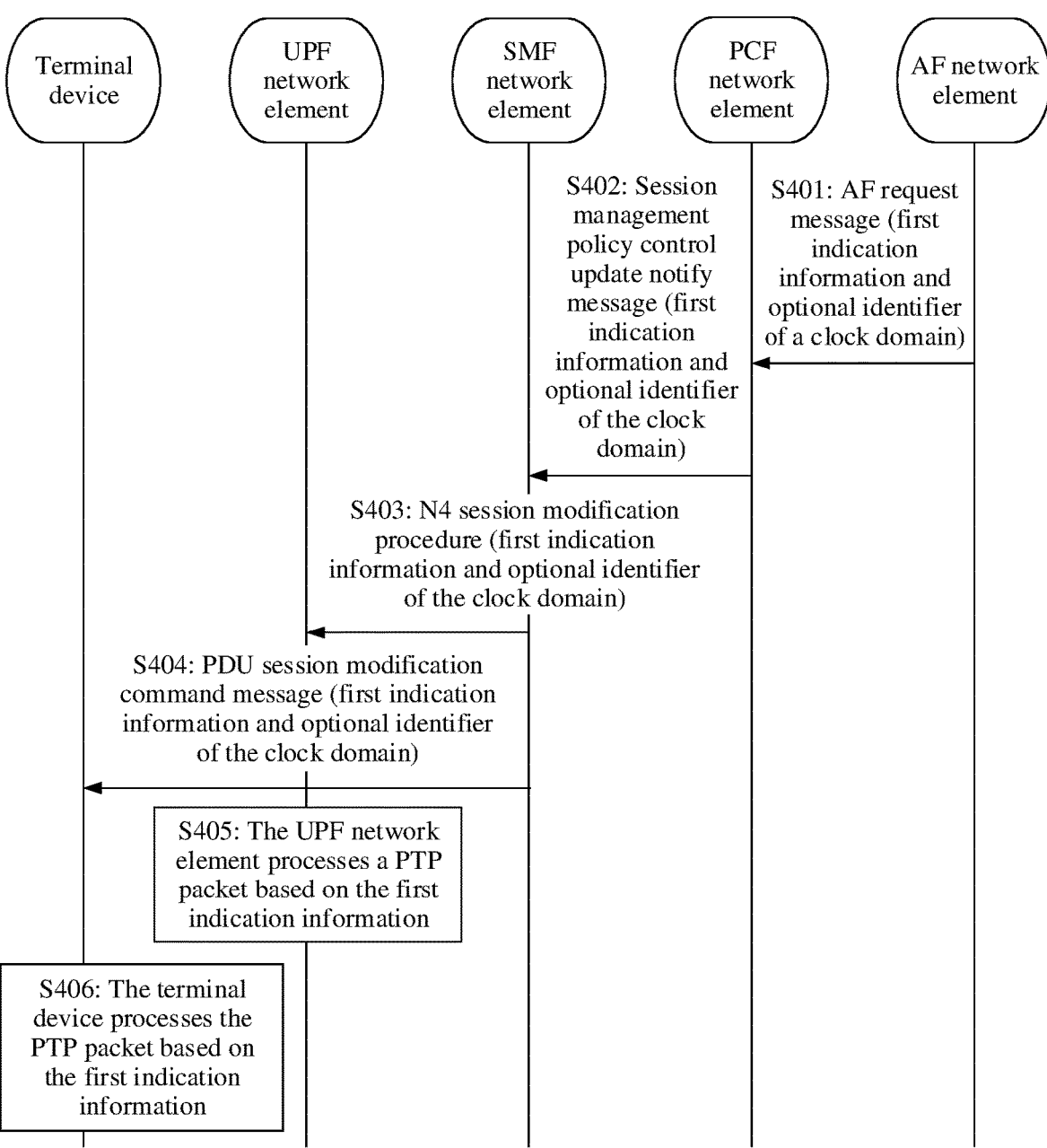
FIG. 4 is a schematic diagram 2 of a clock synchronization mode indication method according to at least one embodiment.

At least one embodiment provides another clock synchronization mode indication method, to describe a case in which an SMF network element configures or stores first indication information (and an optional identifier of a clock domain) in advance, or obtains first indication information (and an optional identifier of a clock domain) from an AF network element, and sends the first indication information to a terminal device and a UPF network element. As shown in FIG. 4, the method includes steps S401 to S406. S401 and S402 are optional, and is not performed in response to the SMF network element configuring or storing the first indication information (and the optional identifier of the clock domain) in advance.

S401: The AF network element sends an AF request message to a PCF network element.

In one manner, the AF network element directly sends the AF request message to the PCF network element. In another manner, the AF network element sends the AF request message to the PCF network element via an NEF network element. Correspondingly, the PCF network element receives the AF request message from the AF network element.

The message includes the first indication information, and optionally, further includes at least one of the identifier of the clock domain, an identifier (for example, an IP address or a GPSI of the terminal device) of the terminal device, and an identifier of a PDU session.

S402: The PCF network element sends a session management policy control update notify (Npcf_SMPolicyControl_UpdateNotify) message to the SMF network element.

Correspondingly, the SMF network element receives the session management policy control update notify (Npcf_SMPolicyControl_UpdateNotify) message from the PCF network element.

The message includes the first indication information, and optionally, further includes at least one of the identifier of the clock domain, the identifier (for example, the IP address or the GPSI of the terminal device) of the terminal device, and the identifier of the PDU session. The identifier (for example, the IP address or the GPSI of the terminal device) of the terminal device or the identifier of the PDU session is used by the SMF network element to determine the PDU session corresponding to the first indication information and the terminal device and the UPF network element that correspond to the PDU session.

For step S401, refer to descriptions of step S301.

S403: The SMF network element sends the first indication information (and the optional identifier of the clock domain) to the UPF network element in an N4 session modification procedure.

Correspondingly, the UPF network element receives the first indication information (and the optional identifier of the clock domain) from the SMF network element in the N4 session modification procedure.

For example, the SMF network element sends an N4 session modification request message to the UPF network element, where the message includes the first indication information. Optionally, the message further includes the identifier of the clock domain.

S404: The SMF network element sends a PDU session modification command message to the terminal device.

The message includes the first indication information (and the optional identifier of the clock domain).

For step S403 and step S404, refer to descriptions of steps S302 and S303.

S405: The UPF network element processes a PTP packet based on the first indication information.

S406: The terminal device processes the PTP packet based on the first indication information.

For step S405 and step S406, refer to descriptions of step S304.

The foregoing clock synchronization mode indication method describes a case in which the SMF network element configures or stores the first indication information (and the optional identifier of the clock domain) in advance, or obtains the first indication information (and the optional identifier of the clock domain) from the AF network element, and sends the first indication information (and the optional identifier of the clock domain) to the terminal device and the UPF network element. In this way, a communication device in the 5G communication system obtains a clock synchronization mode.

Figure 5:
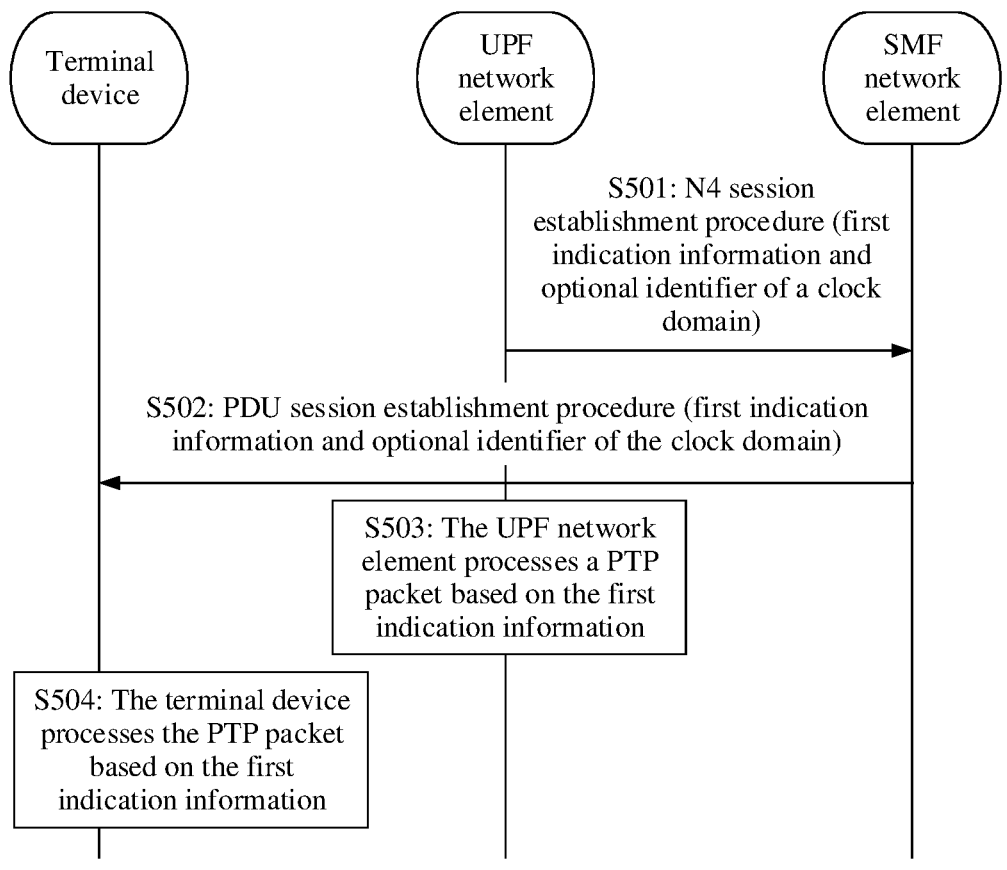
FIG. 5 is a schematic diagram 3 of a clock synchronization mode indication method according to at least one embodiment.

At least one embodiment provides another clock synchronization mode indication method. A UPF network element configures or stores first indication information (and an optional identifier of a clock domain) in advance, and an SMF network element obtains the first indication information (and the optional identifier of the clock domain) from the UPF network element, and sends the first indication information to a terminal device. As shown in FIG. 5, the method includes steps S501 to S504.

S501: The UPF network element sends the first indication information (and the optional identifier of the clock domain) to the SMF network element in an N4 session establishment procedure.

The UPF network element configures or stores the first indication information (and the optional identifier of the clock domain) in advance in the following two manners.

In one manner, the terminal device and the UPF network element support all clock synchronization modes (a P2P TC type, an E2E TC type, and a BC type), and the UPF network element configures or stores first indication information of different clock domains.

In another manner, in response to the terminal device supporting some clock synchronization modes, the terminal device sends, to the UPF network element, the clock synchronization modes supported by the terminal device, and the UPF network element configures the first indication information (and the optional identifier of the clock domain) in the clock synchronization mode supported by the UPF network element.

For example, the SMF network element sends an N4 session establishment request message to the UPF network element, and the UPF network element sends an N4 session establishment response message to the SMF network element. The message includes the first indication information, and optionally, further includes the identifier of the clock domain.

Alternatively, for example, the SMF network element sends an N4 association setup request message to the UPF network element, and the UPF network element sends an N4 association setup response message to the SMF network element. The message includes the first indication information, and optionally, further includes the identifier of the clock domain. For step S501, refer to descriptions of step S301.

S502: The SMF network element sends the first indication information (and the optional identifier of the clock domain) to the terminal device in a PDU session establishment procedure.

For example, the terminal device sends a PDU session establishment request message to the SMF network element, and the SMF network element sends a PDU session establishment accept message to the terminal device. The message includes N1 interface session management information (N1 SM Info), and the information includes the first indication information. Optionally, the information further includes the identifier of the clock domain.

For step S502, refer to descriptions of steps S302 and S303.

S503: The UPF network element processes a PTP packet based on the first indication information.

For step S503, refer to descriptions of step S304.

S504: The terminal device processes the PTP packet based on the first indication information.

For step S504, refer to descriptions of step S304.

The foregoing clock synchronization mode indication method describes a case in which the UPF network element configures or stores the first indication information (and the optional identifier of the clock domain) in advance, and the SMF network element obtains the first indication information (and the optional identifier of the clock domain) from the UPF network element, and sends the first indication information (and the optional identifier of the clock domain) to the terminal device. In this way, a communication device in the 5G communication system obtains a clock synchronization mode.

Figure 6:
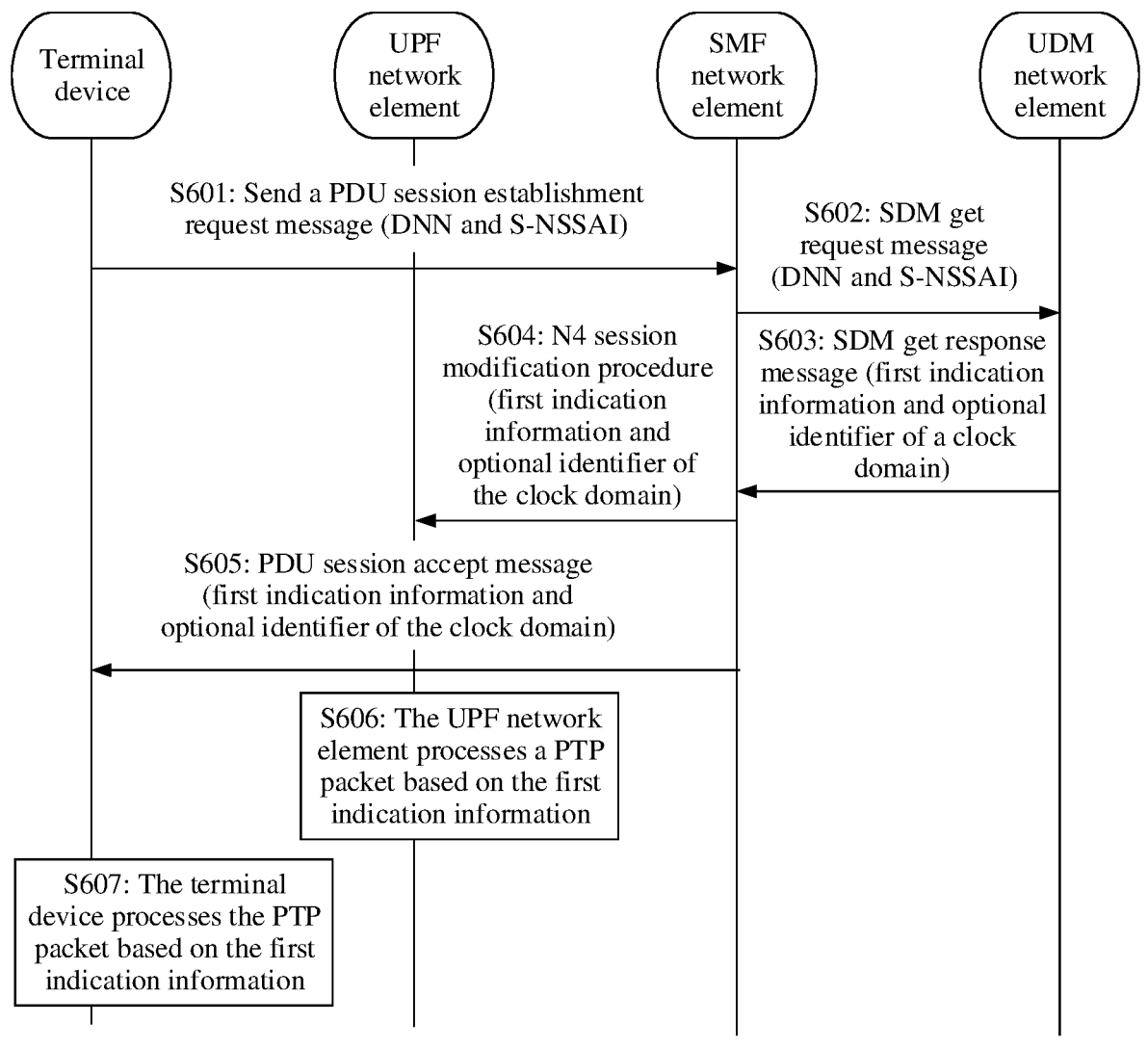
FIG. 6 is a schematic diagram 4 of a clock synchronization mode indication method according to at least one embodiment.

At least one embodiment provides another clock synchronization mode indication method. A UDM network element configures or stores first indication information (and an optional identifier of a clock domain) in advance, and an SMF network element obtains the first indication information (and the optional identifier of the clock domain) from the UDM network element, and sends the first indication information to a terminal device and a UPF network element. As shown in FIG. 6, the method includes steps S601 to S607.

S601: The terminal device sends a PDU session establishment request message to the SMF network element.

The message includes a data network name (data network name, DNN) and single network slice selection assistance information (single network slice selection assistance information, S-NSSAI). The message is used to request to establish a PDU session.

S602: The SMF network element sends an SDM get (Nudm_SDM_Get) request message to the UDM network element.

The message is used to obtain subscription data related to PDU session management. The message includes an identifier of the terminal device, the DNN, and the S-NSSAI. The information is used by the UDM network element to query session management subscription data that is of the terminal device and that is related to the DNN and the S-NSSAI.

S603: The UDM network element sends an SDM get (Nudm_SDM_Get) response message to the SMF network element.

The message includes the session management subscription data that is of the terminal device and that is related to the DNN and the S-NSSAI. The session management subscription data includes the first indication information, and optionally, further includes the identifier of the clock domain.

For step S603, refer to descriptions of step S301.

S604: The SMF network element sends the first indication information (and the optional identifier of the clock domain) to the UPF network element in an N4 session modification procedure.

For step S603, refer to descriptions of step S403.

S605: The SMF network element sends a PDU session establishment accept message to the terminal device.

The message includes the first indication information (and the optional identifier of the clock domain).

For step S605, refer to descriptions of steps S302 and S303.

S606: The UPF network element processes a PTP packet based on the first indication information.

For step S606, refer to descriptions of step S304.

S607: The terminal device processes the PTP packet based on the first indication information.

For step S607, refer to descriptions of step S304.

The foregoing clock synchronization mode indication method describes a case in which the UDM network element configures or stores the first indication information (and the optional identifier of the clock domain) in advance, and the SMF network element obtains the first indication information (and the optional identifier of the clock domain) from the UDM network element, and sends the first indication information (and the optional identifier of the clock domain) to the terminal device. In this way, a communication device in the 5G communication system obtains a clock synchronization mode.

At least one embodiment provides another clock synchronization mode indication method, to describe how an AF network element determines a clock synchronization mode supported by a communication system (namely, a 5GS switching node) in which a first communication device and a second communication device (namely, a terminal device and a UPF network element) are located, so as to further determine a first implementation of first indication information.

Figure 7A:
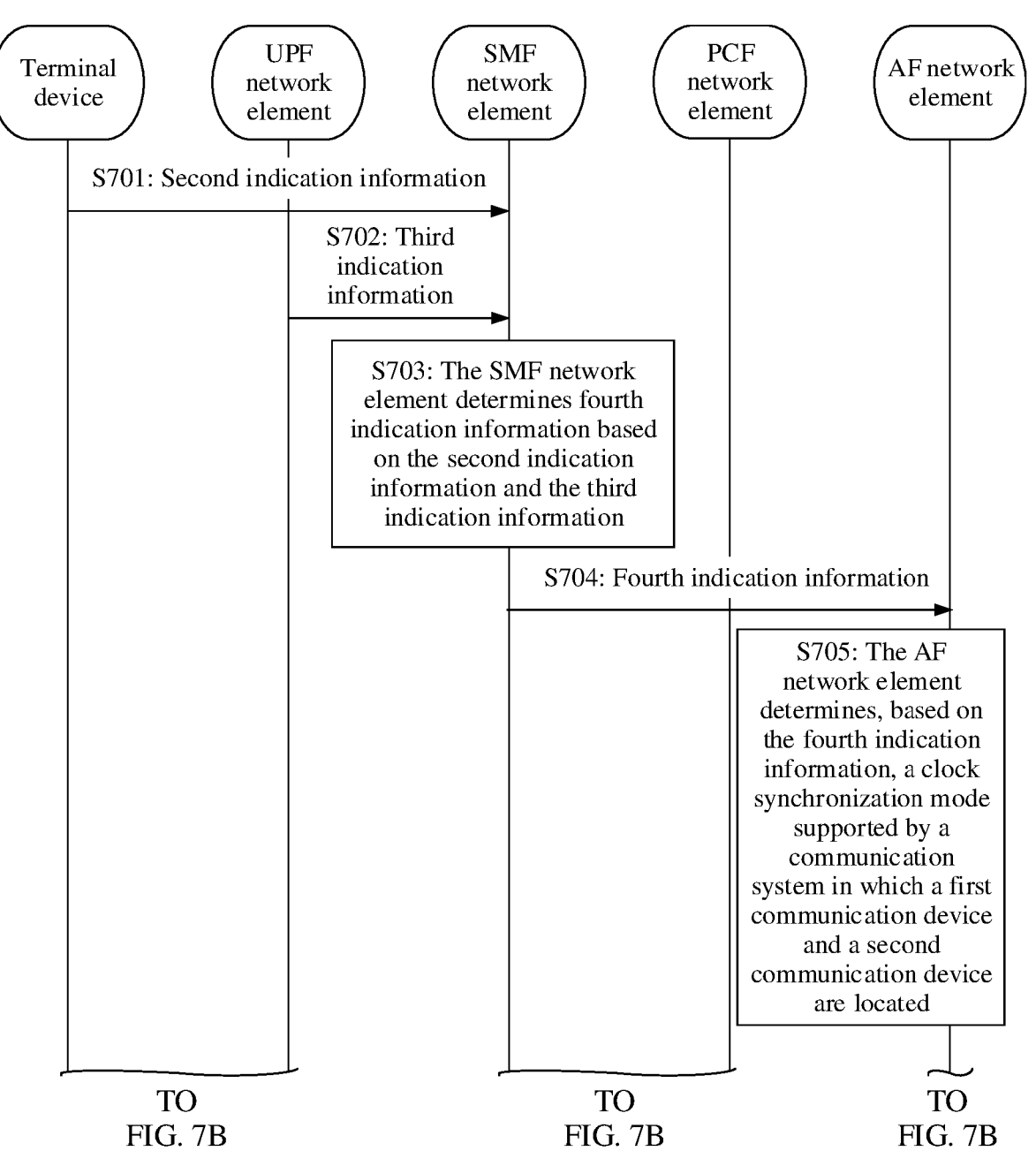
FIG. 7A and FIG. 7B are a schematic diagram 5 of a clock synchronization mode indication method according to at least one embodiment.
Figure 7B:
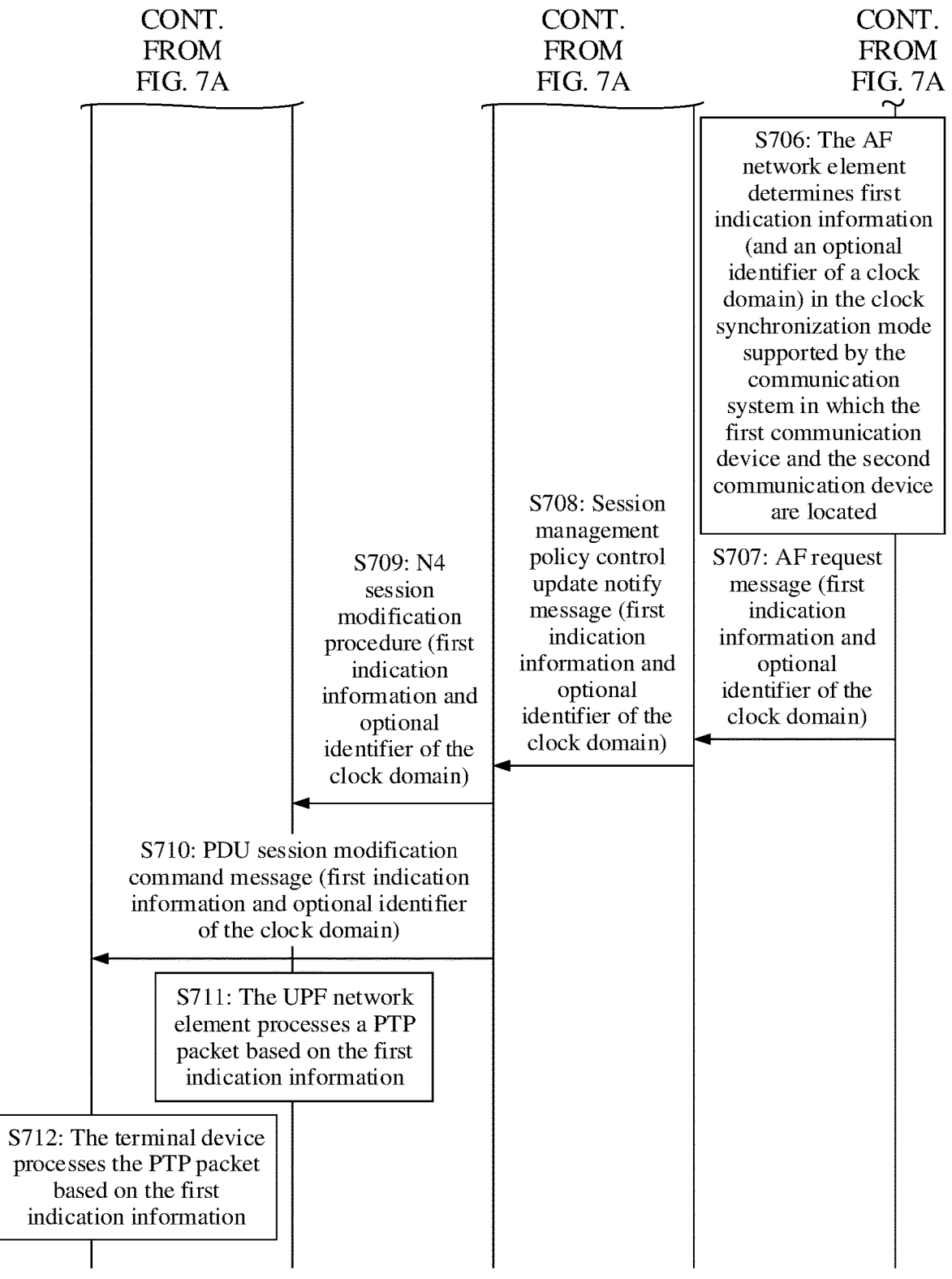

In this implementation, the terminal device sends second indication information to an SMF network element, the UPF network element sends third indication information to the SMF network element, and the SMF network element determines fourth indication information based on the second indication information and the third indication information, and sends the fourth indication information to the AF network element. The AF network element determines, based on the fourth indication information, the clock synchronization mode supported by the communication system (namely, the 5GS switching node) in which the first communication device and the second communication device (namely, the terminal device and the UPF network element) are located, and determines the first indication information (and an optional identifier of a clock domain). The SMF network element obtains the first indication information (and the optional identifier of the clock domain) from the AF network element, and sends the first indication information to the terminal device and the UPF network element. As shown in FIG. 7A and FIG. 7B, the method includes steps S701 to S712.

S701: The terminal device sends the second indication information to the SMF network element.

Correspondingly, the SMF network element receives the second indication information from the terminal device, where the second indication information indicates a clock synchronization mode supported by the terminal device.

In at least one embodiment, the terminal device sends the second indication information to the SMF network element in a PDU session establishment procedure, and correspondingly, the SMF network element receives the second indication information from the terminal device in the PDU session establishment procedure.

For example, the terminal device sends a PDU session establishment request message to the SMF network element, where the message includes the second indication information.

The terminal device performs clock synchronization with another communication device in the communication system via a DS-TT device, and the DS-TT device is independent of the terminal device or integrated with the terminal device. In this case, the second indication information also indicates a clock synchronization mode supported by the DS-TT device.

S702: The UPF network element sends the third indication information to the SMF network element.

Correspondingly, the SMF network element receives the third indication information from the UPF network element, where the third indication information indicates a clock synchronization mode supported by the UPF network element.

In at least one embodiment, the UPF network element sends the third indication information to the SMF network element in an N4 association setup procedure, an N4 session establishment procedure, or an N4 session modification procedure. Correspondingly, the SMF network element receives the third indication information from the UPF network element in the N4 association setup procedure, the N4 session establishment procedure, or the N4 session modification procedure.

For example, for the N4 association setup procedure, the SMF network element sends an N4 association setup request message to the UPF network element, and the UPF network element sends an N4 association setup response message to the SMF network element, where the message includes the third indication information.

For example, for the N4 session establishment procedure, the SMF network element sends an N4 session establishment request message to the UPF network element, and the UPF network element sends an N4 session establishment response message to the SMF network element, where the message includes the third indication information.

For example, for the N4 session modification procedure, the SMF network element sends an N4 session modification request message to the UPF network element, and the UPF network element sends an N4 session modification response message to the SMF network element, where the message includes the third indication information.

S703: The SMF network element determines the fourth indication information based on the second indication information and the third indication information.

The fourth indication information indicates a clock synchronization mode supported by a session between the first communication device and the second communication device (namely, the terminal device and the UPF network element).

The SMF network element obtains an intersection of clock synchronization modes indicated by the second indication information and clock synchronization modes indicated by the third indication information, to obtain the fourth indication information.

For example, in response to the clock synchronization modes supported by the first communication device being BC and P2P TC, and the clock synchronization modes supported by the second communication device are BC, E2E TC, and P2P TC, the SMF network element determines that the clock synchronization modes supported by the session between the first communication device and the second communication device are BC and P2P TC.

S704: The SMF network element sends the fourth indication information to the AF network element.

In at least one embodiment, the SMF network element sends the fourth indication information to the AF network element via a PCF network element.

For example, the SMF network element sends a session management policy control create (Npcf_SMPolicyControl_Create) message or a session management policy control update (Npcf_SMPolicyControl_Update) message to the PCF network element, to request to establish or update a session management policy association (SM Policy Association). The message includes the fourth indication information. The PCF network element directly sends a policy authorization notify (Npcf_PolicyAuthorization_Notify) message to the AF network element, where the message includes the fourth indication information, or the PCF network element sends the fourth indication information to the AF network element via an NEF network element.

In at least one embodiment, the SMF network element sends the fourth indication information to the AF network element via an NEF network element.

S705: The AF network element determines, based on the fourth indication information, the clock synchronization mode supported by the communication system (namely, the 5GS switching node) in which the first communication device and the second communication device (namely, the terminal device and the UPF network element) are located.

The AF network element obtains clock synchronization modes supported by a plurality of PDU sessions of different terminal devices, where the plurality of PDU sessions belong to one 5GS switching node, and the AF network element obtains an intersection of these clock synchronization modes to determine the clock synchronization mode supported by the 5GS switching node.

S706: The AF network element determines the first indication information (and the optional identifier of the clock domain) in the clock synchronization mode supported by the communication system (namely, the 5GS switching node) in which the first communication device and the second communication device (namely, the terminal device and the UPF network element) are located.

In response to the communication system (namely, the 5GS switching node) joining one clock domain, the AF network element selects one of clock synchronization modes supported by the communication system (namely, the 5GS switching node) as the first indication information, and does not determine the identifier of the clock domain.

In response to the communication system (namely, the 5GS switching node) joining a plurality of clock domains, the AF network element selects, for a specific clock domain (distinguished by the identifier of the clock domain), one of clock synchronization modes supported by the communication system (namely, the 5GS switching node) as the first indication information, to obtain the first indication information and the identifier of the clock domain. For example, the 5GS switching node is deployed in a factory. A plurality of terminal devices in a workshop access a network via a UPF network element together. Terminal devices and UPF network elements in a same workshop belong to a same clock domain, and use a same clock synchronization mode. Terminal devices and UPF network elements in different workshops is long to different clock domains, and use different clock synchronization modes. Therefore, the 5GS switching node joins a plurality of clock domains, and configures different clock synchronization modes for different clock domains.

Alternatively, the AF network element sends, to a management network element, the clock synchronization mode supported by the communication system (namely, the 5GS switching node), the management network element determines the first indication information (and the optional identifier of the clock domain), and the AF network element obtains the first indication information (and the optional identifier of the clock domain) from the management network element. For how the management network element determines the first indication information (and the optional identifier of the clock domain) in the clock synchronization mode supported by the communication system (namely, the 5GS switching node), refer to descriptions of the AF network element. Details are not described herein again.

In a process of determining the clock synchronization mode by the management network element or the AF network element, the management network element or the AF network element determines a clock synchronization mode of each node on a synchronization path based on clock to be used for services and a network topology. For steps S707 to S712, refer to descriptions of steps S401 to S406.

The foregoing clock synchronization mode indication method describes a case in which the terminal device sends the clock synchronization mode supported by the terminal device to the SMF network element, the UPF network element sends the clock synchronization mode supported by the UPF network element to the SMF network element, the SMF network element determines, in the clock synchronization mode supported by the terminal device and the clock synchronization mode supported by the UPF network element, the clock synchronization mode supported by the session between the terminal device and the UPF network element, and sends the clock synchronization mode supported by the session between the terminal device and the UPF network element to the AF network element. The AF network element determines, in the clock synchronization mode supported by the session between the terminal device and the UPF network element, the clock synchronization mode supported by the communication system (namely, the 5GS switching node) in which the first communication device and the second communication device (namely, the terminal device and the UPF network element) are located, and determines the first indication information (and the optional identifier of the clock domain). The SMF network element obtains the first indication information (and the optional identifier of the clock domain) from the AF network element, and sends the first indication information to the terminal device and the UPF network element. In this way, a communication device in the 5G communication system obtains the clock synchronization mode.

At least one embodiment provides another clock synchronization mode indication method, to describe how an AF network element determines a clock synchronization mode supported by a communication system (namely, a 5GS switching node) in which a first communication device and a second communication device (namely, a terminal device and a UPF network element) are located, so as to further determine a second implementation of first indication information.

Figure 8A:
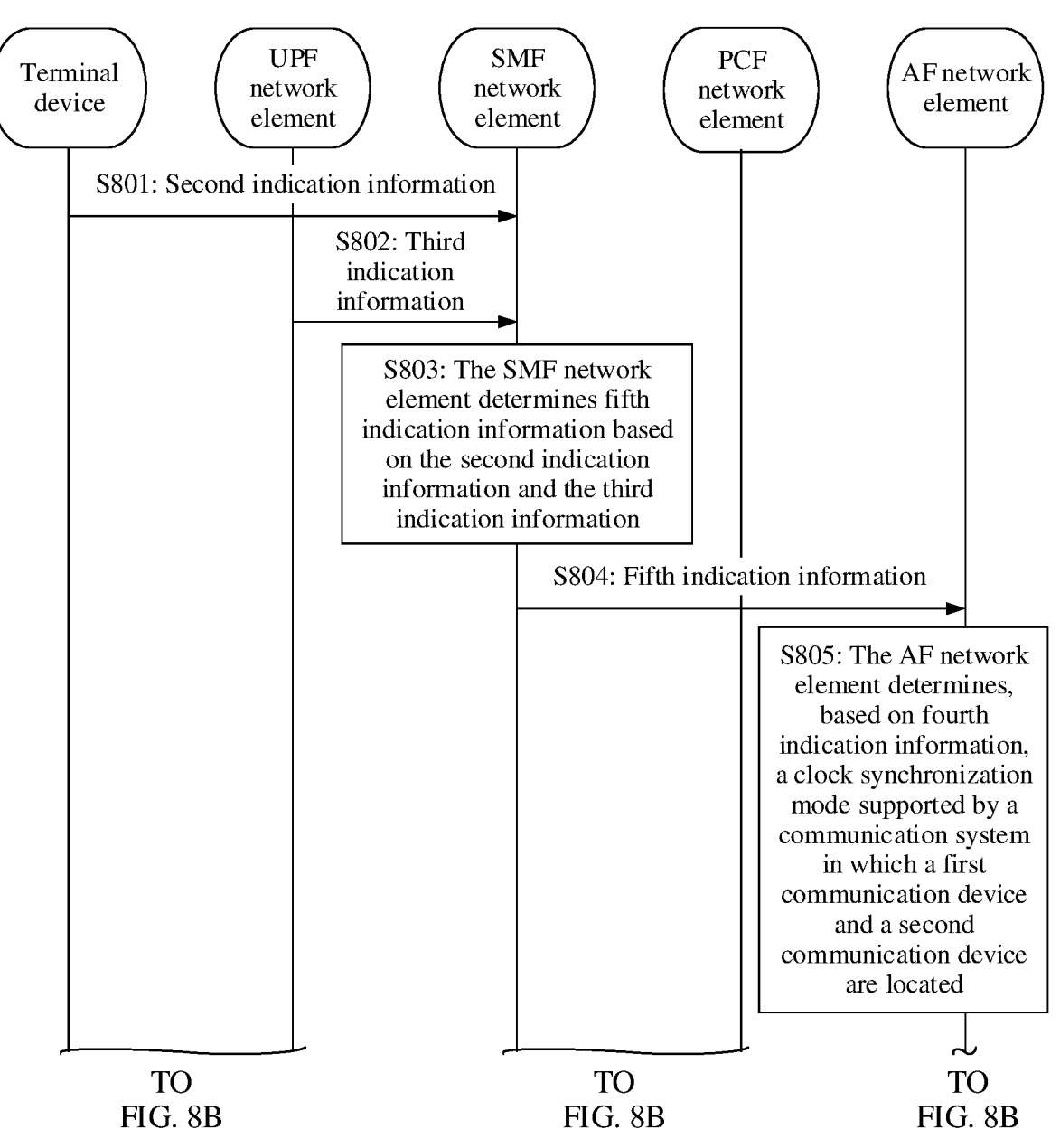
FIG. 8A and FIG. 8B are a schematic diagram 6 of a clock synchronization mode indication method according to at least one embodiment.
Figure 8B:
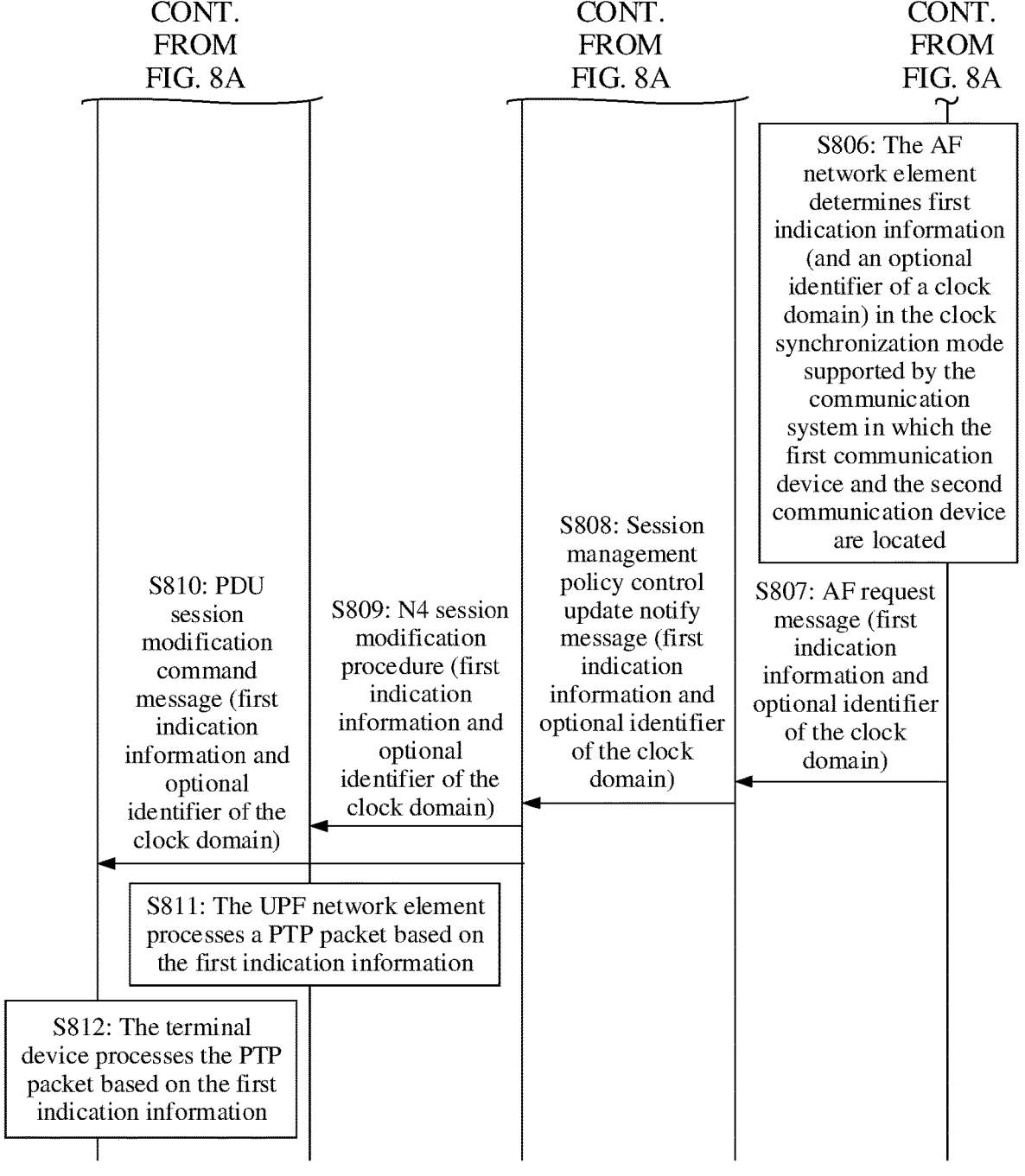

In this implementation, the terminal device sends second indication information to an SMF network element, the UPF network element sends third indication information to the SMF network element, and the SMF network element determines fifth indication information based on the second indication information and the third indication information, and sends the fifth indication information to the AF network element. The AF network element determines, based on the fifth indication information, the clock synchronization mode supported by the communication system (namely, the 5GS switching node) in which the first communication device and the second communication device (namely, the terminal device and the UPF network element) are located, and determines the first indication information (and an optional identifier of a clock domain). The SMF network element obtains the first indication information (and the optional identifier of the clock domain) from the AF network element, and sends the first indication information to the terminal device and the UPF network element. As shown in FIG. 8A and FIG. 8B, the method includes steps S801 to S812.

For steps S801 and S802, refer to descriptions of steps S701 and S702.

S803: The SMF network element determines the fifth indication information based on the second indication information and the third indication information.

The fifth indication information indicates the clock synchronization mode supported by the communication system (namely, the 5GS switching node) in which the first communication device and the second communication device (namely, the terminal device and the UPF network element) are located.

The SMF network element obtains an intersection of clock synchronization modes indicated by the second indication information and clock synchronization modes indicated by the third indication information, to obtain the fifth indication information.

For example, the SMF network element receives the second indication information from a plurality of terminal devices. The SMF network element determines, based on second indication information a from a terminal device 1 and the third indication information from the UPF network element, that clock synchronization modes supported by a PDU session 1 between the terminal device 1 and the UPF network element are BC and P2P TC. The SMF network element determines, based on second indication information b from a terminal device 2 and the third indication information from the UPF network element, that a clock synchronization mode supported by a PDU session 2 between the terminal device 2 and the UPF network element is BC. The SMF network element obtains an intersection of these clock synchronization modes, and determines that a clock synchronization mode supported by the 5GS switching node in which the PDU session 1 and the PDU session 2 are located is BC.

S804: The SMF network element sends the fifth indication information to the AF network element.

In at least one embodiment, the SMF network element sends the fifth indication information to the AF network element via a PCF network element.

For example, the SMF network element sends a session management policy control create (Npcf_SMPolicyControl_Create) message or a session management policy control update (Npcf_SMPolicyControl_Update) message to the PCF network element, to request to establish or update a session management policy association (SM Policy Association). The message includes the fifth indication information. The PCF network element directly sends a policy authentication notify (Npcf_PolicyAuthentication_Notify) message to the AF network element, where the message includes the fifth indication information, or the PCF network element sends the fifth indication information to the AF network element via an NEF network element.

In at least one embodiment, the SMF network element sends the fifth indication information to the AF network element via an NEF network element.

S805: The AF network element determines, based on the fifth indication information, the clock synchronization mode supported by the communication system (namely, the 5GS switching node) in which the first communication device and the second communication device (namely, the terminal device and the UPF network element) are located.

Because the fifth indication information indicates the clock synchronization mode supported by the communication system (namely, the 5GS switching node), the AF network element directly determines, based on the fifth indication information, the clock synchronization mode supported by the communication system (namely, the 5GS switching node).

S806: The AF network element determines the first indication information in the clock synchronization mode supported by the communication system (namely, the 5GS switching node) in which the first communication device and the second communication device (namely, the terminal device and the UPF network element) are located.

For step S806, refer to descriptions of step S706.

For steps S807 to S812, refer to descriptions of steps S401 to S406.

The foregoing clock synchronization mode indication method describes a case in which the terminal device sends a clock synchronization mode supported by the terminal device to the SMF network element, the UPF network element sends a clock synchronization mode supported by the UPF network element to the SMF network element, the SMF network element determines, in the clock synchronization mode supported by the terminal device and the clock synchronization mode supported by the UPF network element, the clock synchronization mode supported by the communication system in which the terminal device and the UPF network element are located, and sends the clock synchronization mode supported by the communication system in which the terminal device and the UPF network element are located to the AF network element. The AF network element determines the first indication information (and the optional identifier of the clock domain) in the clock synchronization mode supported by the communication system (namely, the 5GS switching node) in which the first communication device and the second communication device (namely, the terminal device and the UPF network element) are located. The SMF network element obtains the first indication information (and the optional identifier of the clock domain) from the AF network element, and sends the first indication information to the terminal device and the UPF network element. In this way, a communication device in the 5G communication system obtains the clock synchronization mode.

At least one embodiment provides another clock synchronization mode indication method, to describe how an AF network element determines a clock synchronization mode supported by a communication system (namely, a 5GS switching node) in which a first communication device and a second communication device (namely, a terminal device and a UPF network element) are located, so as to further determine a first implementation of first indication information.

Figure 9A:
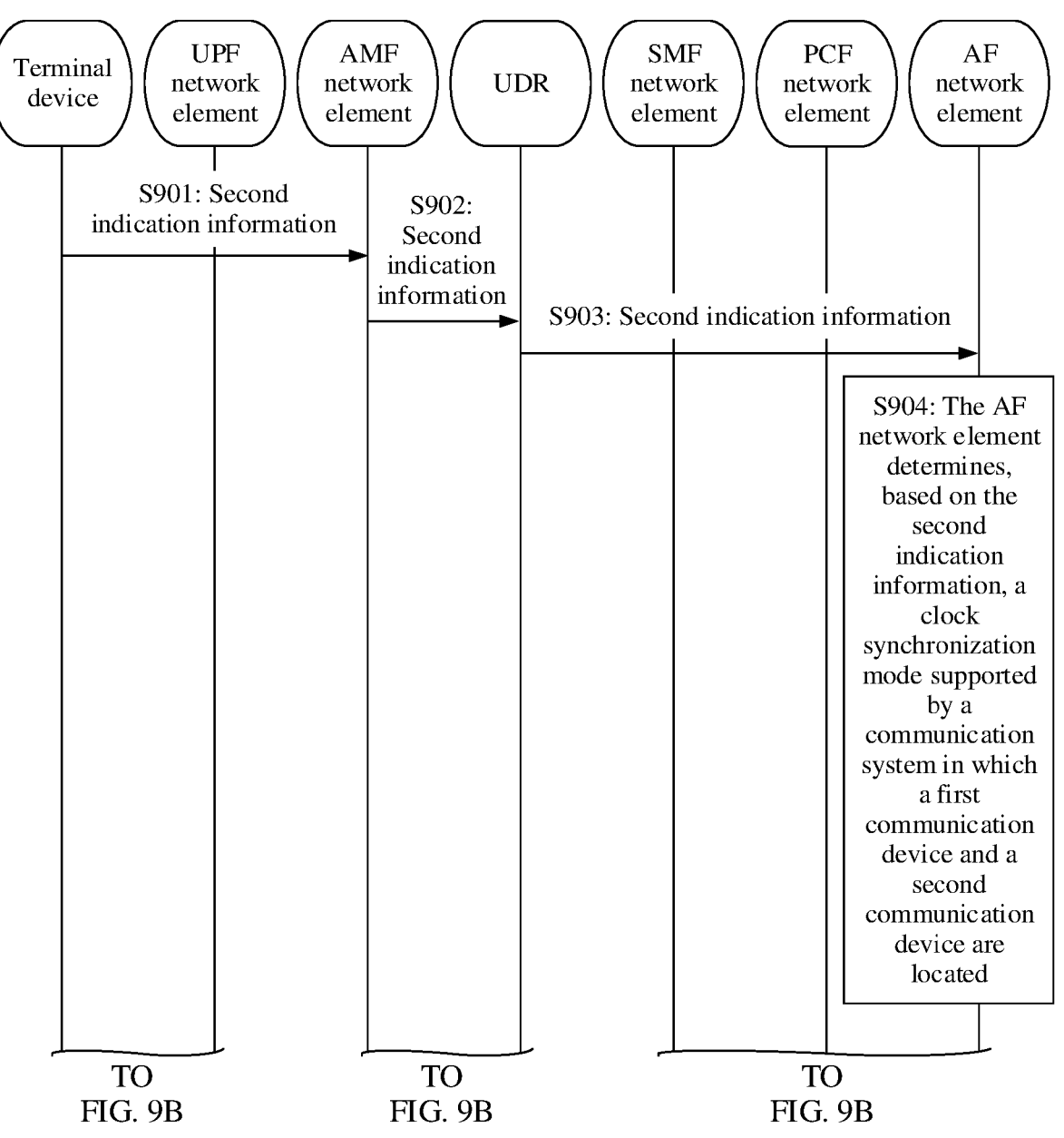
FIG. 9A, FIG. 9B, and FIG. 9C are a schematic diagram 7 of a clock synchronization mode indication method according to at least one embodiment.
Figures 9B, 9C:
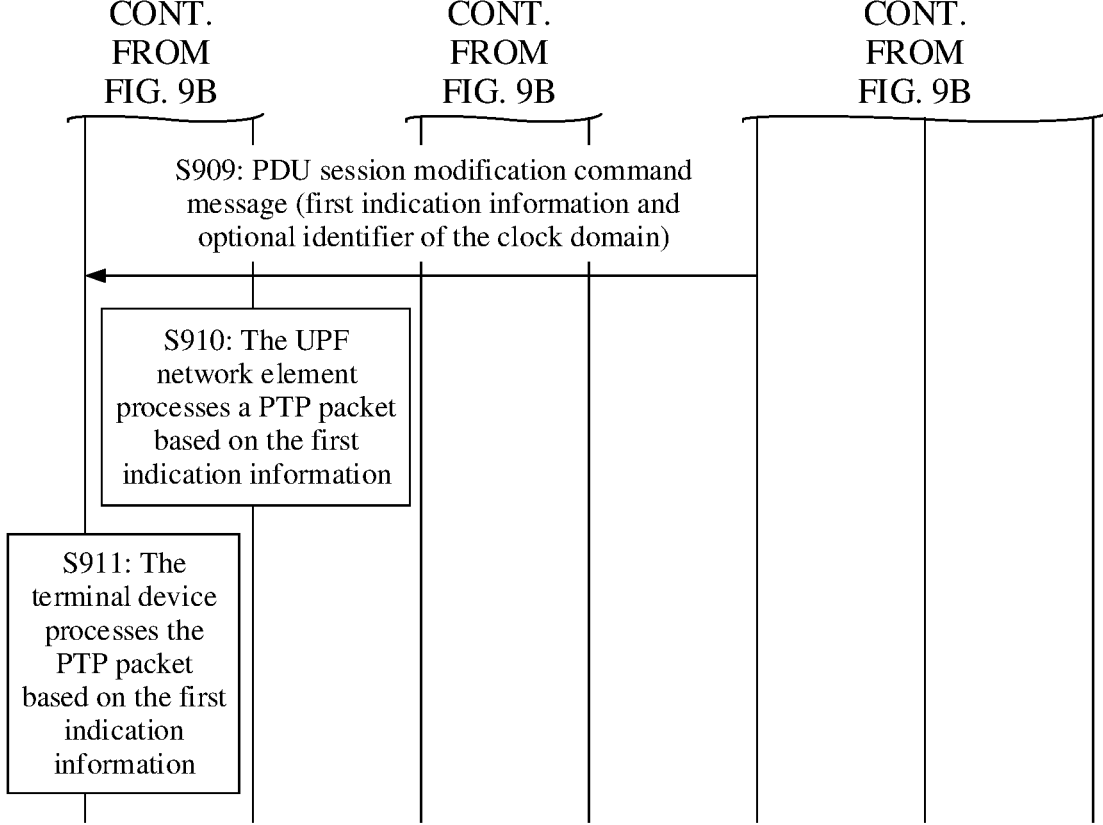

In this implementation, the terminal device sends second indication information to a UDM network element via an AMF network element. The UDM network element stores the second indication information in a UDR. The AF network element obtains the second indication information from the UDR, and the AF network element determines, based on the second indication information, the clock synchronization mode supported by the communication system (namely, the 5GS switching node) in which the first communication device and the second communication device (namely, the terminal device and the UPF network element) are located, and determines the first indication information (and an optional identifier of a clock domain). The SMF network element obtains the first indication information (and the optional identifier of the clock domain) from the AF network element, and sends the first indication information (and the optional identifier of the clock domain) to the terminal device and the UPF network element. As shown in FIG. 9A, FIG. 9B, and FIG. 9C, the method includes steps S901 to S911.

S901: The terminal device sends the second indication information to the AMF network element.

The terminal device sends the second indication information to the AMF network element in a registration procedure. Correspondingly, the AMF network element receives the second indication information from the terminal device in the registration procedure. For the second indication information, refer to the foregoing descriptions.

For example, the terminal device sends a registration request message to the AMF network element, where the message includes the second indication information.

S902: The AMF network element sends the second indication information to the unified data repository (unified data repository, UDR).

The AMF network element sends the second indication information to the UDM network element in the registration procedure. Correspondingly, the UDM network element receives the second indication information from the AMF network element in the registration procedure.

For example, after receiving the registration request message from the terminal device, the AMF network element registers with the UDM network element based on a terminal device connection management registration (Nudm_UECM_Registration) message. The message includes an identifier (for example, a permanent identifier (subscription permanent identifier, SUPI) of a user) of the terminal device UE and the second indication information.

After receiving the second indication information, the UDM network element stores the second indication information in the UDR.

S903: The AF network element obtains the second indication information from the UDR via an NEF network element.

For example, the AF network element sends an AF request message to the NEF network element, the NEF network element obtains the second indication information from the UDR, and the NEF network element sends an AF request response message to the AF network element, where the message includes the second indication information.

The NEF network element directly obtains the second indication information from the UDR. For example, the NEF network element obtains the second indication information from the UDR based on a data management query (Nudr_DM_Query) request message. Alternatively, the NEF network element obtains the second indication information from the UDR via the UDM network element. For example, the NEF network element subscribes to, from the UDM network element based on an event exposure subscribe (Nudm_EventExposure_Subscribe) message, a clock synchronization mode supported by the terminal device. After obtaining the second indication information from the UDR through querying, the UDM network element provides the second indication information for the NEF network element based on an event exposure subscribe (Nudm_EventExposure_Subscribe) response message.

S904: The AF network element determines, based on the second indication information, the clock synchronization mode supported by the communication system (namely, the 5GS switching node) in which the first communication device and the second communication device (namely, the terminal device and the UPF network element) are located.

The AF network element obtains clock synchronization modes supported by a plurality of terminal devices, where the plurality of terminal devices belong to one 5GS switching node, and the AF network element obtains an intersection of these clock synchronization modes to determine the clock synchronization mode supported by the 5GS switching node. In this case, the UPF supports all clock synchronization modes (a P2P TC type, an E2E TC type, and a BC type). Therefore, the clock synchronization mode supported by the communication system (namely, the 5GS switching node) in which the first communication device and the second communication device (namely, the terminal device and the UPF network element) are located is determined in the clock synchronization modes supported by the terminal devices.

S905: The AF network element determines the first indication information in the clock synchronization mode supported by the communication system (namely, the 5GS switching node) in which the first communication device and one communication device (the terminal device and the UPF network element) are located.

For step S905, refer to descriptions of step S706.

For steps S906 to S911, refer to descriptions of steps S401 to S406.

The foregoing clock synchronization mode indication method describes the following case: The terminal device sends, via the AMF network element to the UDM network element, the clock synchronization mode supported by the terminal device. The UDM network element stores, in the UDR, the clock synchronization mode supported by the terminal device. The AF network element obtains, from the UDR, the clock synchronization mode supported by the terminal device. The AF network element determines, in the clock synchronization mode supported by the terminal device, the clock synchronization mode supported by the communication system (namely, the 5GS switching node) in which the first communication device and the second communication device (the terminal device and the UPF network element) are located, and determines the first indication information (and the optional identifier of the clock domain). The SMF network element obtains the first indication information (and the optional identifier of the clock domain) from the AF network element, and sends the first indication information (and the optional identifier of the clock domain) to the terminal device and the UPF network element. In this way, a communication device in the 5G communication system obtains the clock synchronization mode.

In the foregoing embodiments, the methods and/or steps implemented by the SMF network element is also implemented by a component (for example, a chip or a circuit) that is used in the SMF network element, and the methods and/or steps implemented by the first communication device (the terminal device or the UPF network element) is also implemented by a component that is used in the first communication device.

The foregoing mainly describes the solutions provided in embodiments described herein from a perspective of interaction between network elements. Correspondingly, embodiments described herein further provide a communication apparatus, and the communication apparatus is configured to implement the foregoing various methods. The communication apparatus is the SMF network element in the foregoing method embodiments, an apparatus including the foregoing SMF network element, or a chip or a function module in the SMF network element. Alternatively, the communication apparatus is the first communication device (the terminal device or the UPF network element) in the foregoing method embodiments, or an apparatus including the foregoing first communication device, or is a chip or a functional module in the first communication device.

To implement the foregoing functions, the communication apparatus includes a hardware structure and/or a software module for performing a corresponding function. A person skilled in the art should easily be aware that, in combination with units and algorithm steps of the examples described in embodiments disclosed herein, at least one embodiment is implemented by hardware or a combination of hardware and computer software. Whether a function is performed by hardware or hardware driven by computer software depends on particular applications and design constraints of the technical solutions. A person skilled in the art is able to use different methods to implement the described functions for embodiment described herein, but the implementation does not goes beyond the scope of embodiments described herein.

In at least one embodiment, the communication apparatus is divided into functional modules based on the foregoing method embodiments. For example, each functional module is obtained through division based on each corresponding function, or two or more functions is integrated into one processing module. The integrated module is implemented in a form of hardware, or is implemented in a form of a software functional module. It should be noted that, in embodiments described herein, module division is an example, and is merely a logical function division. In actual implementation, another division manner is used.

Figure 10:
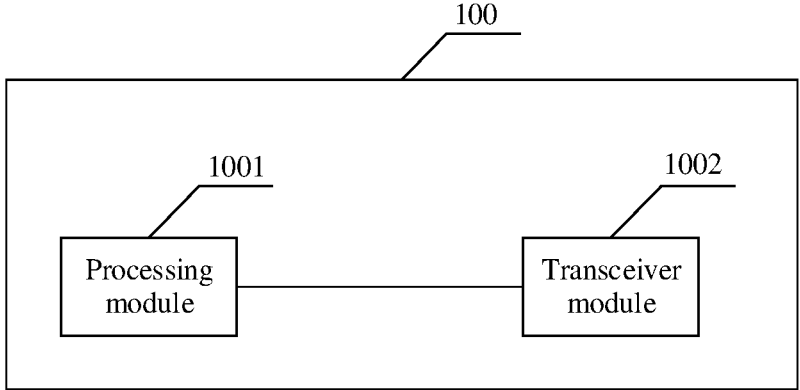
FIG. 10 is a schematic diagram of a structure of a communication apparatus according to at least one embodiment.

For example, the communication apparatus is the SMF network element in the foregoing method embodiments. FIG. 10 is a schematic diagram of a structure of a communication apparatus 100. The communication apparatus 100 is the SMF network element in FIG. 1. The communication apparatus 100 includes a processing module 1001 and a transceiver module 1002. The processing module 1001 is also referred to as a processing unit, and is configured to implement a processing function of the SMF network element in the foregoing method embodiments, for example, perform step S301 in FIG. 3, step S703 in FIG. 7A and FIG. 7B, and step S803 in FIG. 8A and FIG. 8B. The transceiver module 1002 is also referred to as a transceiver unit, and is configured to implement a transceiver function of the SMF network element in the foregoing method embodiments, for example, perform step S302 in FIG. 3, steps S402 to S404 in FIG. 4, steps S501 and S502 in FIG. 5, steps S601 to S605 in FIG. 6, steps S701, S702, S704, and S708 to S710 in FIG. 7A and FIG. 7B, steps S801, S802, S804, and S808 to S810 in FIG. 8A and FIG. 8B, and steps S907 to S909 in FIG. 9A, FIG. 9B, and FIG. 9C. The transceiver module 1002 is referred to as a transceiver circuit, a transceiver machine, a transceiver, or a communication interface.

For example, the processing module 1001 is configured to obtain first indication information, where the first indication information indicates a clock synchronization mode used in a communication system in which a terminal device and a user plane function network element are located. The transceiver module 1002 is configured to send the first indication information to the terminal device.

In at least one embodiment, the processing module 1001 is further configured to obtain an identifier of a clock domain, where the identifier of the clock domain and the first indication information indicate a clock synchronization mode used in the clock domain by the communication system in which the terminal device and the user plane function network element are located. The transceiver module 1002 is further configured to send the identifier of the clock domain to the terminal device.

In at least one embodiment, the transceiver module 1002 is further configured to send the identifier of the clock domain to the user plane function network element.

In at least one embodiment, the transceiver module 1002 is further configured to send the first indication information to the user plane function network element.

In at least one embodiment, the processing module 1001 is further configured to: determine fourth indication information based on second indication information and third indication information, where the second indication information indicates a clock synchronization mode supported by the terminal device, the third indication information indicates a clock synchronization mode supported by the user plane function network element, and the fourth indication information indicates a clock synchronization mode supported by a session between the terminal device and the user plane function network element. The transceiver module 1002 is further configured to send the fourth indication information to an application function network element.

In at least one embodiment, the processing module 1001 is further configured to: determine fifth indication information based on second indication information and third indication information, where the second indication information indicates a clock synchronization mode supported by the terminal device, the third indication information indicates a clock synchronization mode supported by the user plane function network element, and the fifth indication information indicates a clock synchronization mode supported by the communication system in which the terminal device and the user plane function network element are located. The transceiver module 1002 is further configured to send the fifth indication information to an application function network element.

In at least one embodiment, the transceiver module 1002 is further configured to receive the second indication information from the terminal device.

In at least one embodiment, the transceiver module 1002 is further configured to receive the third indication information from the user plane function network element.

In at least one embodiment, the transceiver module 1002 is specifically configured to send the first indication information to the terminal device in a protocol data unit PDU session establishment procedure.

In at least one embodiment, the transceiver module 1002 is specifically configured to send the first indication information to the terminal device in a PDU session modification procedure.

In at least one embodiment, the clock synchronization mode includes the peer-to-peer transparent clock type, an end-to-end transparent clock type, or a boundary clock type.

In this embodiment, the communication apparatus 100 is presented in a form of functional modules obtained through division in an integrated manner. The module herein is an ASIC, a circuit, a processor that executes one or more software or firmware programs, a memory, an integrated logic circuit, and/or another component capable of providing the foregoing functions.

Specifically, a function/an implementation process of the processing module 1001 in FIG. 10 is implemented by a processor in the SMF network element by invoking computer-executable instructions stored in a memory. A function/an implementation process of the transceiver module 1002 in FIG. 10 is implemented by a communication interface in the SMF network element.

Because the communication apparatus 100 provided in this embodiment performs the foregoing methods, for a technical effect that is achieved by the communication apparatus 100, refer to the foregoing method embodiments. Details are not described herein again.

Figure 11:
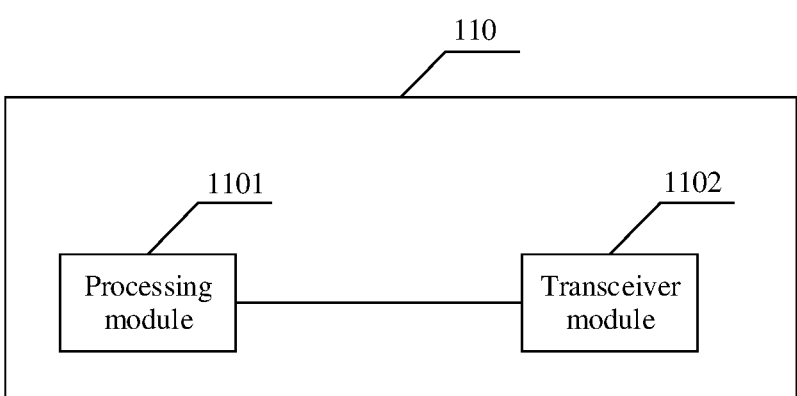
FIG. 11 is a schematic diagram of a structure of another communication apparatus according to at least one embodiment.

For example, the communication apparatus is the first communication device (the terminal device or the UPF network element) in the foregoing method embodiments. FIG. 11 is a schematic diagram of a structure of a communication apparatus 110. The communication apparatus 110 is a terminal device or a UPF network element in FIG. 1. The communication apparatus 110 includes a processing module 1101 and a transceiver module 1102. The processing module 1101 is also referred to as a processing unit, and is configured to implement a processing function of the first communication device in the foregoing method embodiments, for example, perform steps S303 and S304 in FIG. 3, steps S405 and S406 in FIG. 4, steps S503 and S504 in FIG. 5, steps S606 and S607 in FIG. 6, steps S711 and S712 in FIG. 7A and FIG. 7B, steps S811 and S812 in FIG. 8A and FIG. 8B, and steps S910 and S911 in FIG. 9A, FIG. 9B, and FIG. 9C. The transceiver module 1102 is also referred to as a transceiver unit, and is configured to implement a transceiver function of the first communication device in the foregoing method embodiments, for example, perform step S302 in FIG. 3, steps S403 and S404 in FIG. 4, steps S501 and S502 in FIG. 5, steps S601, S604, and S605 in FIG. 6, steps S701, S702, S709, and S710 in FIG. 7A and FIG. 7B, steps S801, S802, S809, and S810 in FIG. 8A and FIG. 8B, and steps S901, S908, and S909 in FIG. 9A, FIG. 9B, and FIG. 9C. The transceiver module 1102 is referred to as a transceiver circuit, a transceiver machine, a transceiver, or a communication interface.

For example, the processing module 1101 is configured to obtain first indication information, where the first indication information indicates a clock synchronization mode used in a communication system in which the first communication apparatus and a second communication apparatus are located, and the first communication apparatus is a terminal device, and the second communication apparatus is a user plane function network element; or the first communication apparatus is a user plane function network element, and the second communication apparatus is a terminal device. The processing module 1101 is further configured to process a precision time protocol PTP packet based on the first indication information.

In at least one embodiment, the apparatus further includes a transceiver module 1102, configured to receive the first indication information from a session management function network element.

In at least one embodiment, the processing module 1101 is further configured to obtain an identifier of a clock domain, where the identifier of the clock domain and the first indication information indicate a clock synchronization mode used in the clock domain by the communication system in which the first communication apparatus and the second communication apparatus are located.

In at least one embodiment, the apparatus further includes the transceiver module 1102, configured to receive the identifier of the clock domain from the session management function network element.

In at least one embodiment, the processing module 1101 is configured to process the PTP packet based on the identifier of the clock domain and the first indication information.

In at least one embodiment, the first communication apparatus is the terminal device, and the first communication apparatus further includes the transceiver module 1102, configured to send second indication information to the session management function network element in a protocol data unit PDU session establishment procedure, where the second indication information indicates a clock synchronization mode supported by the first communication apparatus.

In at least one embodiment, the first communication apparatus is the terminal device, and the first communication apparatus further includes the transceiver module 1102, configured to send second indication information to an access and mobility management function network element in a registration procedure, where the second indication information indicates a clock synchronization mode supported by the first communication apparatus.

In at least one embodiment, the first communication apparatus is the user plane function network element, and the first communication apparatus further includes a transceiver module 1102, configured to send third indication information to the session management function network element in an N4 association setup procedure, an N4 session establishment procedure, or an N4 session modification procedure, where the third indication information indicates a clock synchronization mode supported by the first communication apparatus.

In at least one embodiment, if the first indication information indicates that the clock synchronization mode is a peer-to-peer transparent clock type, the first communication apparatus further includes the transceiver module 1102. The transceiver module 1102 is configured to receive the PTP packet from an upstream node that is in the communication system. The processing module 1101 is configured to update a correction field or a suffix field of the PTP packet based on a PTP link delay between the first communication apparatus and the upstream node. The transceiver module 1102 is further configured to send an updated PTP packet to the second communication apparatus, where the PTP packet includes a synchronization packet or a follow up packet corresponding to the synchronization packet, and the suffix field is for updating the correction field.

In at least one embodiment, the clock synchronization mode includes the peer-to-peer transparent clock type, an end-to-end transparent clock type, or a boundary clock type.

The second communication apparatus is the second communication device described above.

In this embodiment, the communication apparatus 110 is presented in a form of functional modules obtained through division in an integrated manner. The module herein is an ASIC, a circuit, a processor that executes one or more software or firmware programs, a memory, an integrated logic circuit, and/or another component capable of providing the foregoing functions.

Specifically, a function/an implementation process of the processing module 1101 in FIG. 11 is implemented by a processor in the first communication device by invoking computer-executable instructions stored in a memory. A function/an implementation process of the transceiver module 1102 in FIG. 11 is implemented by a communication interface in the first communication device.

Because the communication apparatus 110 provided in this embodiment performs the foregoing methods, for a technical effect that is achieved by the communication apparatus 110, refer to the foregoing method embodiments. Details are not described herein again.

Figure 12:
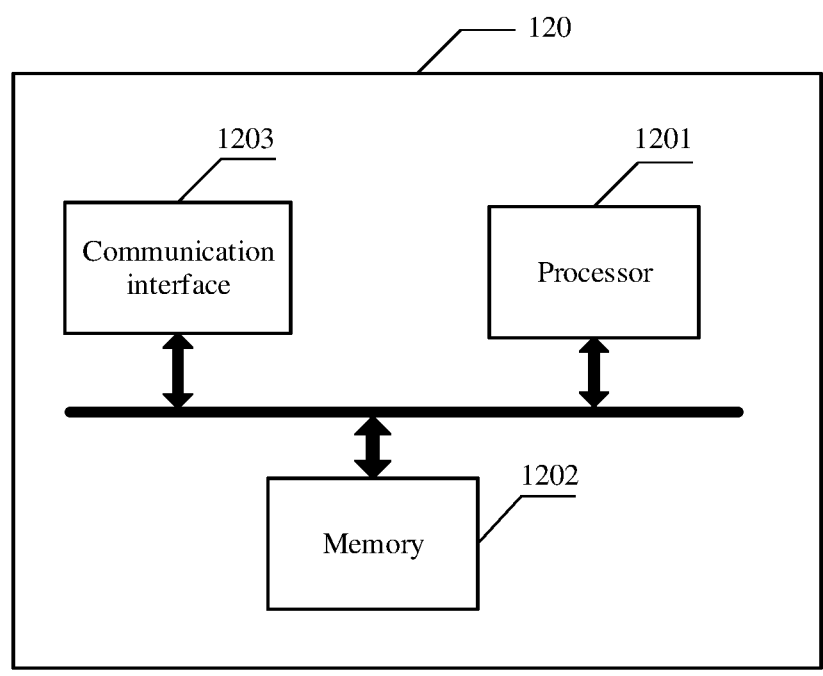
FIG. 12 is a schematic diagram of a structure of still another communication apparatus according to at least one embodiment.

As shown in FIG. 12, at least one embodiment further provides a communication apparatus. The communication apparatus 120 includes a processor 1201, a memory 1202, and a communication interface 1203, and the processor 1201 is coupled to the memory 1202. In response to the processor 1201 executing a computer program or instructions in the memory 1202, the methods corresponding to the SMF network element in FIG. 3 to FIG. 9A, FIG. 9B, and FIG. 9C are performed.

Figure 13:
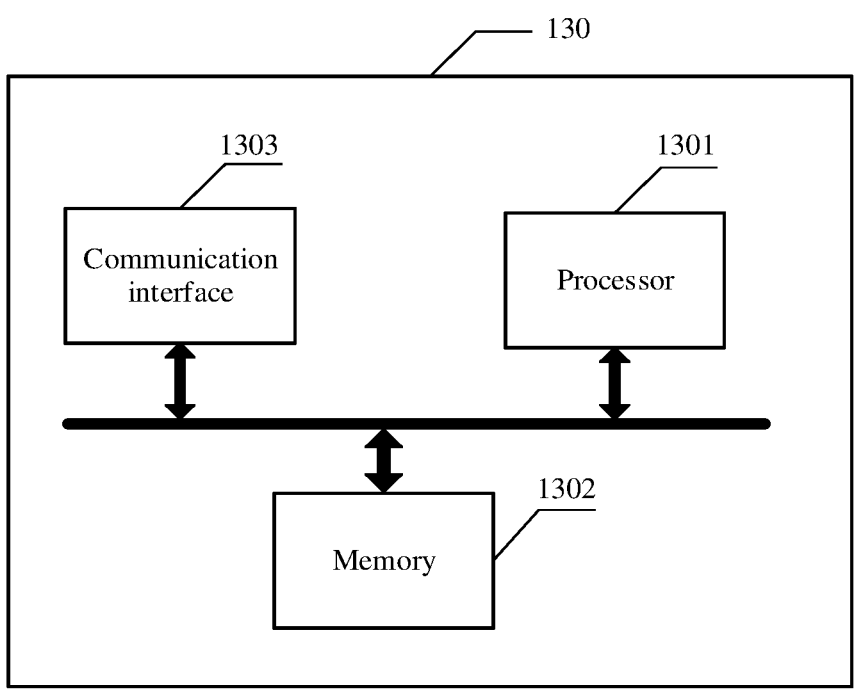
FIG. 13 is a schematic diagram of a structure of yet another communication apparatus according to at least one embodiment.

As shown in FIG. 13, at least one embodiment further provides a communication apparatus. The communication apparatus 130 includes a processor 1301, a memory 1302, and a communication interface 1303, and the processor 1301 is coupled to the memory 1302. In response to the processor 1301 executing a computer program or instructions in the memory 1302, the methods corresponding to the first communication device, the terminal device, or the UPF network element in FIG. 3 to FIG. 9A, FIG. 9B, and FIG. 9C are performed.

At least one embodiment further provides a computer-readable storage medium. The computer-readable storage medium stores a computer program. In response to the computer program being run on a computer or a processor, the computer or the processor is enabled to perform the methods corresponding to the SMF network element in FIG. 3 to FIG. 9A, FIG. 9B, and FIG. 9C.

At least one embodiment further provides a computer-readable storage medium. The computer-readable storage medium stores a computer program. In response to the computer program being run on a computer or a processor, the computer or the processor is enabled to perform the methods corresponding to the first communication device, the terminal device, or the UPF network element in FIG. 3 to FIG. 9A, FIG. 9B, and FIG. 9C.

At least one embodiment further provides a computer program product including instructions. In response to the instructions being run on a computer or a processor, the computer or the processor is enabled to perform the methods corresponding to the SMF network element in FIG. 3 to FIG. 9A, FIG. 9B, and FIG. 9C.

At least one embodiment further provides a computer program product including instructions. In response to the instructions being run on a computer or a processor, the computer or the processor is enabled to perform the methods corresponding to the first communication device, the terminal device, or the UPF network element in FIG. 3 to FIG. 9A, FIG. 9B, and FIG. 9C.

At least one embodiment provides a chip system. The chip system includes a processor used by a communication apparatus to perform the methods corresponding to the SMF network element in FIG. 3 to FIG. 9A, FIG. 9B, and FIG. 9C, or perform the methods corresponding to the first communication device, the terminal device, or the UPF network element in FIG. 3 to FIG. 9A, FIG. 9B, and FIG. 9C.

In at least one embodiment, the chip system further includes a memory, and the memory is configured to store necessary program instructions and necessary data. The chip system includes a chip and an integrated circuit, or includes a chip and another discrete device. This is not specifically limited in at least one embodiment.

The communication apparatus, the chip, the computer storage medium, the computer program product, or the chip system described in embodiments herein are all configured to perform the foregoing methods. Therefore, for beneficial effects that is achieved by the communication apparatus, the chip, the computer storage medium, the computer program product, or the chip system, refer to beneficial effects in the foregoing implementations. Details are not described herein again.

The processor in embodiments described herein is a chip. For example, the processor is a field programmable gate array (field programmable gate array, FPGA), an application-specific integrated chip (application-specific integrated circuit, ASIC), a system-on-a-chip (system-on-a-chip, SoC), a central processing unit (central processor unit, CPU), a network processor (network processor, NP), a digital signal processor (digital signal processor, DSP), a micro controller unit (micro controller unit, MCU), a programmable logic device (programmable logic device, PLD), or another integrated chip.

The memory in embodiments described herein is a volatile memory or a nonvolatile memory, or includes a volatile memory and a nonvolatile memory. The nonvolatile memory is a read-only memory (read-only memory, ROM), a programmable read-only memory (programmable ROM, PROM), an erasable programmable read-only memory (erasable PROM, EPROM), an electrically erasable programmable read-only memory (electrically EPROM, EEPROM), or a flash memory. The volatile memory is a random access memory (random access memory, RAM), used as an external cache. Through example but not limitative description, many forms of RAMs is used, for example, a static random access memory (static RAM, SRAM), a dynamic random access memory (dynamic RAM, DRAM), a synchronous dynamic random access memory (synchronous DRAM, SDRAM), a double data rate synchronous dynamic random access memory (double data rate SDRAM, DDR SDRAM), an enhanced synchronous dynamic random access memory (enhanced SDRAM, ESDRAM), a synchronous link dynamic random access memory (synchlink DRAM, SLDRAM), and a direct rambus random access memory (direct rambus RAM, DR RAM). The memory of the systems and methods described in this specification includes but is not limited to these and any memory of another proper type.

Sequence numbers of the foregoing processes do not mean execution sequences in at least one embodiment. The execution sequences of the processes should be determined based on functions and internal logic of the processes, and should not constitute any limitation on implementation processes of at least one embodiment.

A person of ordinary skill in the art is aware that, in combination with the examples described in embodiments disclosed in this specification, units and algorithm steps is implemented by electronic hardware or a combination of computer software and electronic hardware. Whether the functions are performed by hardware or software depends on particular applications and design constraints of the technical solutions. A person skilled in the art is able to use different methods to implement the described functions for at least one embodiment, but the implementation does not go beyond the scope of embodiments described herein.

A person skilled in the art understands that, for the purpose of convenient and brief description, for a detailed working process of the foregoing system, apparatuses, and units, refer to a corresponding process in the foregoing method embodiments, and details are not described herein again.

In the several embodiments provided herein, the disclosed system, devices, and methods are implemented in other manners. For example, the described device embodiments are merely examples. For example, division into the units is merely logical function division and is other division in actual implementation. For example, a plurality of units or components is combined or integrated into another system, or some features is ignored or not performed. In addition, the displayed or discussed mutual couplings or direct couplings or communication connections is implemented through some interfaces. The indirect couplings or communication connections between the devices or units is implemented in electronic, mechanical, or other forms.

The units described as separate parts may or may not be physically separate, and parts displayed as units may or may not be physical units, in other words, is located in one position, or is distributed on a plurality of network units. Some or all of the units is selected based on actual use to achieve the objectives of the solutions of embodiments.

In addition, functional units in at least one embodiment is integrated into one processing unit, or each of the units exist alone physically, or two or more units is integrated into one unit.

All or some of the foregoing embodiments are implemented through software, hardware, firmware, or any combination thereof. In response to a software program being used to implement embodiments, embodiments is implemented completely or partially in a form of a computer program product. The computer program product includes one or more computer instructions. In response to the computer program instructions being loaded and executed on a computer, the procedure or functions according to at least one embodiment are all or partially generated. The computer is a general-purpose computer, a dedicated computer, a computer network, or other programmable apparatuses. The computer instructions is stored in a computer-readable storage medium or is transmitted from a computer-readable storage medium to another computer-readable storage medium. For example, the computer instructions is transmitted from a website, computer, server, or data center to another website, computer, server, or data center in a wired (for example, a coaxial cable, an optical fiber, or a digital subscriber line (Digital Subscriber Line, DSL)) or wireless (for example, infrared, radio, or microwave) manner. The computer-readable storage medium is any usable medium accessible by a computer, or a data storage device, such as a server or a data center, integrating one or more usable media. The usable medium is a magnetic medium (for example, a floppy disk, a hard disk, or a magnetic tape), an optical medium (for example, a DVD), a semiconductor medium (for example, a solid-state drive (Solid-State Drive, SSD)), or the like.

The foregoing descriptions are merely specific implementations of at least one embodiment, but are not intended to limit the protection scope of embodiments described herein. Any variation or replacement readily figured out by a person skilled in the art within the technical scope disclosed herein shall fall within the protection scope of at least one embodiment. Therefore, the protection scope of embodiments described herein shall be subject to the protection scope of the claims.

What is claimed is:

1. A clock synchronization mode indication method, comprising:

obtaining, by a first communication device, first indication information and an identifier of a clock domain, wherein the first indication information and the identifier of the clock domain indicate a clock synchronization mode used in the clock domain in a communication system in which the first communication device and a second communication device are located, and the first communication device is a terminal device, and the second communication device is a user plane function network element; or the first communication device is a user plane function network element, and the second communication device is a terminal device;

processing, by the first communication device, a precision time protocol PTP packet based on the first indication information.

2. The method according to claim 1, wherein the obtaining, by the first communication device, first indication information includes:

receiving, by the first communication device, the first indication information from a session management function network element.

3. The method according to claim 1, wherein the obtaining, by the first communication device, the identifier of the clock domain includes:

receiving, by the first communication device, the identifier of the clock domain from the session management function network element.

4. The method according to claim 1, wherein the processing, by the first communication device, a precision time protocol PTP packet based on the first indication information includes:

processing, by the first communication device, the PTP packet based on the identifier of the clock domain and the first indication information.

5. The method according to claim 1, wherein the first communication device is the terminal device, and the method further comprises:

sending, by the first communication device, second indication information to the session management function network element in a protocol data unit PDU session establishment procedure, wherein the second indication information indicates the clock synchronization mode supported by the first communication device.

6. The method according to claim 1, wherein the first communication device is the terminal device, and the method further comprises:

sending, by the first communication device, second indication information to an access and mobility management function network element in a registration procedure, wherein the second indication information indicates the clock synchronization mode supported by the first communication device.

7. The method according to claim 1, wherein the first communication device is the user plane function network element, and the method further comprises:

sending, by the first communication device, third indication information to the session management function network element in an N4 association setup procedure, an N4 session establishment procedure, or an N4 session modification procedure, wherein the third indication information indicates the clock synchronization mode supported by the first communication device.

8. The method according to claim 1, wherein in response to the first indication information indicating that the clock synchronization mode is a peer-to-peer transparent clock type, the processing, by the first communication device, a precision time protocol PTP packet based on the first indication information includes:

receiving, by the first communication device, the PTP packet from an upstream node that is in the communication system, updating a correction field or a suffix field of the PTP packet based on a PTP link delay between the first communication device and the upstream node, and sending an updated PTP packet to the second communication device, wherein the PTP packet includes a synchronization packet or a follow up packet corresponding to the synchronization packet, and the suffix field is for updating the correction field.

9. The method according to claim 1, wherein the clock synchronization mode includes the peer-to-peer transparent clock type, an end-to-end transparent clock type, or a boundary clock type.

10. A first communication apparatus, comprising:

a processor, configured to obtain first indication information and an identifier of a clock domain, wherein the first indication information and the identifier of the clock domain indicate a clock synchronization mode used in the clock domain in a communication system in which the first communication apparatus and a second communication apparatus are located, and the first communication apparatus is a terminal device, and the second communication apparatus is a user plane function network element; or the first communication apparatus is a user plane function network element, and the second communication apparatus is a terminal device; and the processor is further configured to process a precision time protocol PTP packet based on the first indication information.

11. The first communication apparatus according to claim 10, wherein the processor is configured to:

process the PTP packet based on the identifier of the clock domain and the first indication information.

12. The first communication apparatus according to claim 10, wherein in response to the first indication information indicating that the clock synchronization mode is a peer-to-peer transparent clock type, the first communication apparatus further includes a transceiver, and the transceiver is configured to receive the PTP packet from an upstream node that is in the communication system;

the processor is configured to update a correction field or a suffix field of the PTP packet based on a PTP link delay between the first communication apparatus and the upstream node; and the transceiver is further configured to send an updated PTP packet to the second communication apparatus, wherein the PTP packet includes a synchronization packet or a follow up packet corresponding to the synchronization packet, and the suffix field is for updating the correction field.

13. The first communication apparatus according to claim 10, wherein the clock synchronization mode includes the peer-to-peer transparent clock type, an end-to-end transparent clock type, or a boundary clock type.

14. A clock synchronization mode indication method, comprising:

sending, by an application function, or a network exposure function, first indication information and an identifier of a clock domain;

obtaining, by a first communication device, the first indication information and the identifier of a clock domain, wherein the first indication information and the identifier of the clock domain indicate a clock synchronization mode used in the clock domain in a communication system in which the first communication device and a second communication device are located, and the first communication device is a terminal device, and the second communication device is a user plane function network element; or the first communication device is a user plane function network element, and the second communication device is a terminal device; and processing, by the first communication device, a precision time protocol PTP packet based on the first indication information.

15. The method according to claim 14, wherein the first communication device is the terminal device, and the method further comprises:

sending, by the first communication device, second indication information to the session management function network element in a protocol data unit PDU session establishment procedure, wherein the second indication information indicates the clock synchronization mode supported by the first communication device.

16. The method according to claim 14, wherein the first communication device is the user plane function network element, and the method further comprises:

sending, by the first communication device, third indication information to the session management function network element in an N4 association setup procedure, an N4 session establishment procedure, or an N4 session modification procedure, wherein the third indication information indicates the clock synchronization mode supported by the first communication device.

17. The method according to claim 14, wherein the clock synchronization mode includes the peer-to-peer transparent clock type, an end-to-end transparent clock type, or a boundary clock type.

18. A communication system, comprising an application function, or a network exposure function, and further comprising a first communication device, wherein the application function or the network exposure function is configured to send first indication information and an identifier of a clock domain;

the first communication device is configured to obtain the first indication information and the identifier of a clock domain, wherein the first indication information and the identifier of the clock domain indicate a clock synchronization mode used in the clock domain in a communication system in which the first communication device and a second communication device are located, and the first communication device is a terminal device, and the second communication device is a user plane function network element; or the first communication device is a user plane function network element, and the second communication device is a terminal device; and process a precision time protocol PTP packet based on the first indication information.

19. The system according to claim 18, wherein the first communication device is the terminal device, and the first communication device is further configured to:

send second indication information to the session management function network element in a protocol data unit PDU session establishment procedure, wherein the second indication information indicates the clock synchronization mode supported by the first communication device.

20. The system according to claim 18, wherein the first communication device is the user plane function network element, and the first communication device is further configured to:

send third indication information to the session management function network element in an N4 association setup procedure, an N4 session establishment procedure, or an N4 session modification procedure, wherein the third indication information indicates the clock synchronization mode supported by the first communication device.

* * * * *